US012261432B2

(12) United States Patent
Ayer et al.

(10) Patent No.: US 12,261,432 B2
(45) Date of Patent: Mar. 25, 2025

(54) ELECTRICAL LOAD MANAGEMENT SYSTEM

(71) Applicant: ECOJIVA LLC, Troy, MI (US)

(72) Inventors: Sridhar K. Ayer, Bloomfield Hills, MI (US); Terence Antony Goveas, Farmington Hills, MI (US); Clement David Vijayakumar, Royal Oak, MI (US); Jyothi Puli, Bloomfield Hills, MI (US)

(73) Assignee: ECOJIVA LLC, Troy, MI (US)

( * ) Notice: Subject to any disclaimer, the term of this patent is extended or adjusted under 35 U.S.C. 154(b) by 0 days.

(21) Appl. No.: 18/114,020

(22) Filed: Feb. 24, 2023

(65) Prior Publication Data

US 2023/0283102 A1 Sep. 7, 2023

Related U.S. Application Data

(63) Continuation-in-part of application No. 16/918,240, filed on Jul. 1, 2020, now abandoned, which is a continuation of application No. 15/838,640, filed on Dec. 12, 2017, now abandoned.

(60) Provisional application No. 62/436,516, filed on Dec. 20, 2016.

(51) Int. Cl.
 *H02J 13/00* (2006.01)
 *G01D 4/00* (2006.01)
 *G06Q 50/06* (2012.01)
 *H02J 3/14* (2006.01)

(52) U.S. Cl.
 CPC ........ *H02J 13/00004* (2020.01); *G01D 4/004* (2013.01); *G06Q 50/06* (2013.01); *H02J 3/14* (2013.01); *H02J 13/00007* (2020.01); *H02J 13/00028* (2020.01); *H02J 2310/14* (2020.01)

(58) Field of Classification Search
 CPC ...................................................... G01D 4/004
 See application file for complete search history.

(56) References Cited

U.S. PATENT DOCUMENTS

| 4,349,879 | A | 9/1982 | Peddie et al. |
| 4,489,386 | A | 12/1984 | Breddan |
| 4,620,283 | A | 10/1986 | Butt et al. |
| 6,301,528 | B1 | 10/2001 | Bertram et al. |
| 6,510,369 | B1 | 1/2003 | Lacy |

(Continued)

FOREIGN PATENT DOCUMENTS

EP 2200142 A1 6/2010

*Primary Examiner* — Nathan L Laughlin
(74) *Attorney, Agent, or Firm* — Gregory D. DeGrazia

(57) ABSTRACT

An electrical load management system for controlling first, second, and third electrical loads is provided. A load management computer determines a demand threshold indicating a threshold amount of demanded power from a utility company power grid. The computer determines whether a time interval has an associated non-peak energy charge. And if so, then the computer determines whether a first total load request from the first, second, and third electrical loads will exceed the demand threshold. And if so, then the computer determines whether a second total load request from the first and second electrical loads having high and medium load priorities, respectively, will exceed the demand threshold. And if not, then the computer commands the first and second electrical loads to be energized for the predetermined time interval.

9 Claims, 16 Drawing Sheets

(56) References Cited

U.S. PATENT DOCUMENTS

| | | |
|---|---|---|
| 8,831,789 B2 * | 9/2014 | Weatherhead ............ H02J 3/14 710/110 |
| 9,248,752 B2 | 2/2016 | Kuribayashi et al. |
| 2004/0057177 A1 | 3/2004 | Glahn et al. |
| 2004/0117330 A1 | 6/2004 | Ehlers et al. |
| 2004/0124703 A1 | 7/2004 | Tani et al. |
| 2005/0216131 A1 | 9/2005 | Sodemann et al. |
| 2006/0085100 A1 | 4/2006 | Marin-Martinod et al. |
| 2006/0184288 A1 | 8/2006 | Rodgers |
| 2006/0284604 A1 * | 12/2006 | Qi ............................ H02P 9/14 322/7 |
| 2007/0043478 A1 | 2/2007 | Ehlers et al. |
| 2009/0240381 A1 | 9/2009 | Lane |
| 2011/0204720 A1 * | 8/2011 | Ruiz ..................... B60L 53/305 307/66 |
| 2011/0258018 A1 | 10/2011 | Tyagi et al. |
| 2011/0320828 A1 | 12/2011 | Boss et al. |
| 2012/0046798 A1 | 2/2012 | Orthlieb et al. |
| 2012/0083930 A1 | 4/2012 | Ilic et al. |
| 2013/0184884 A1 | 7/2013 | More et al. |
| 2014/0084687 A1 * | 3/2014 | Dent ...................... H02M 7/537 307/29 |
| 2014/0196761 A1 | 7/2014 | Tlley et al. |
| 2014/0210267 A1 * | 7/2014 | Ishida ................. H02J 7/00712 320/136 |
| 2014/0277795 A1 | 9/2014 | Matsuoka et al. |
| 2014/0358470 A1 | 12/2014 | Miura et al. |
| 2015/0001945 A1 | 1/2015 | Estes |
| 2016/0137087 A1 | 5/2016 | Haas et al. |
| 2016/0226235 A1 * | 8/2016 | Lathrop ..................... H02J 4/00 |
| 2016/0226254 A1 | 8/2016 | Cheng et al. |
| 2016/0274653 A1 | 9/2016 | Mydlil |
| 2017/0005515 A1 * | 1/2017 | Sanders ................... H02J 3/322 |
| 2017/0012429 A1 | 1/2017 | Nanda |
| 2017/0047771 A1 * | 2/2017 | Motsenbocker .......... G05F 1/67 |
| 2017/0088001 A1 | 3/2017 | Haas et al. |
| 2017/0248338 A1 * | 8/2017 | Ray ........................ G05B 15/02 |
| 2018/0066860 A1 * | 3/2018 | Carlson .................... F24F 11/77 |

* cited by examiner

LOAD TABLE — 900

| | | |
|---|---|---|
| ELECTRICAL LOAD 51 | HIGH LOAD PRIORITY | 901 |
| ELECTRICAL LOAD 52 | HIGH LOAD PRIORITY | 902 |
| ELECTRICAL LOAD 53 | MEDIUM LOAD PRIORITY | 903 |
| ELECTRICAL LOAD 54 | MEDIUM LOAD PRIORITY | 904 |
| ELECTRICAL LOAD 55 | LOW LOAD PRIORITY | 905 |
| ELECTRICAL LOAD 56 | LOW LOAD PRIORITY | 906 |

FIG. 29

LOAD REQUEST TABLE — 940

| | | |
|---|---|---|
| ELECTRICAL LOAD 51 | 5,000 WATTS | 941 |
| ELECTRICAL LOAD 52 | 500 WATTS | 942 |
| ELECTRICAL LOAD 53 | 2,000 WATTS | 943 |
| ELECTRICAL LOAD 54 | 1,000 WATTS | 944 |
| ELECTRICAL LOAD 55 | 3,000 WATTS | 945 |
| ELECTRICAL LOAD 56 | 500 WATTS | 946 |

FIG. 30

ELECTRICAL LOAD MANAGEMENT SYSTEM

PRIOR APPLICATIONS

The present application is a Continuation-In-Part of Ser. No. 16/918,240 filed on Jul. 1, 2020 which is a continuation of U.S. patent application Ser. No. 15/838,640 filed on Dec. 12, 2017, which claims priority to U.S. Provisional Patent Application No. 62/436,516, filed Dec. 20, 2016, which is hereby incorporated herein by reference in its entirety.

BACKGROUND

The inventors herein have recognized a need for an improved electrical load management system that selects specific electrical loads to be energized from a plurality of electrical loads to ensure that a total load request associated with the energized electrical loads is below a demand threshold, utilizing a load priority of each of the electrical loads.

SUMMARY

An electrical load management system for controlling at least first, second, third, fourth, fifth, and sixth electrical loads in accordance with an exemplary embodiment is provided. The electrical load management system includes a local power generator. The electrical load management system further includes a main electrical service panel electrically coupled to the local power generator and a utility company power grid. The electrical load management system further includes a first power meter that outputs a power signal indicating a power capacity of the local power generator. The power capacity corresponds to an amount of electrical power being output by the local power generator to the main electrical service panel. The electrical load management system further includes a load management computer operably coupled to the first power meter. The load management computer determines that the first and second electrical loads each have a high load priority, the third and fourth electrical loads each have a medium load priority, and the fifth and sixth electrical loads each have a low load priority. The load management computer further determines a demand threshold associated with the utility company power grid. The demand threshold indicating a threshold amount of demanded power from the utility company power grid which when exceeded will result in a predetermined monetary charge. The load management computer further determines whether the local power generator is outputting electrical power based on the power signal from the first power meter. And if not, then the load management computer further determines whether there is a load requirement in a predetermined time interval from a present time for the first, second, third, fourth, fifth, and sixth electrical loads. And if so, then the load management computer further determines whether the predetermined time interval has an associated non-peak energy charge associated with the utility company power grid. And if so, then the load management computer further determines whether a first total load request from the first, second, third, fourth, fifth, and sixth electrical loads will exceed the demand threshold. And if so, then the load management computer further determines whether a second total load request from the first and second electrical loads having the high load priority and the third and fourth electrical loads having the medium load priority will exceed the demand threshold. And if not, then the load management computer further commands the first, second, third and fourth electrical loads to be energized for the predetermined time interval from the present time, and the fifth and sixth electrical loads to be de-energized.

An electrical load management system for controlling at least first, second, and third electrical loads in accordance with another exemplary embodiment is provided. The electrical load management system includes a local power generator. The electrical load management system further includes a main electrical service panel electrically coupled to the local power generator and a utility company power grid. The electrical load management system further includes a first power meter that outputs a power signal indicating an amount of electrical power being output by the local power generator to the main electrical service panel. The electrical load management system further includes a load management computer operably coupled to the first power meter. The load management computer determines that the first electrical load has a high load priority, the second electrical load has a medium load priority, and the third electrical load has a low load priority. The load management computer further determines a demand threshold associated with the utility company power grid. The demand threshold indicating a threshold amount of demanded power from the utility company power grid which when exceeded will result in a predetermined monetary charge. The load management computer further determines whether the local power generator is outputting electrical power based on the power signal from the first power meter. And if not, then the load management computer further determines whether there is a load requirement in a predetermined time interval from a present time for the first, second, and third electrical loads. And if so, then the load management computer further determining whether the predetermined time interval has an associated non-peak energy charge associated with the utility company power grid. And if so, then the load management computer further determines whether a first total load request from the first, second, and third electrical loads will exceed the demand threshold. And if so, then the load management computer further determines whether a second total load request from the first and second electrical loads, having the high and medium load priorities, respectively, will exceed the demand threshold. And if not, then the load management computer further commands the first and second electrical loads, having the high and medium load priorities, respectively, to be energized for the predetermined time interval from the present time, and the third electrical load to be de-energized.

BRIEF DESCRIPTION OF THE DRAWINGS

FIG. 29 is a schematic of an exemplary load priority table utilized by the electrical load management system in FIG. 1;

FIG. 30 is a schematic of load table indicating power levels required to energize each electrical load of a plurality of electrical loads.

DETAILED DESCRIPTION

Figure 1:
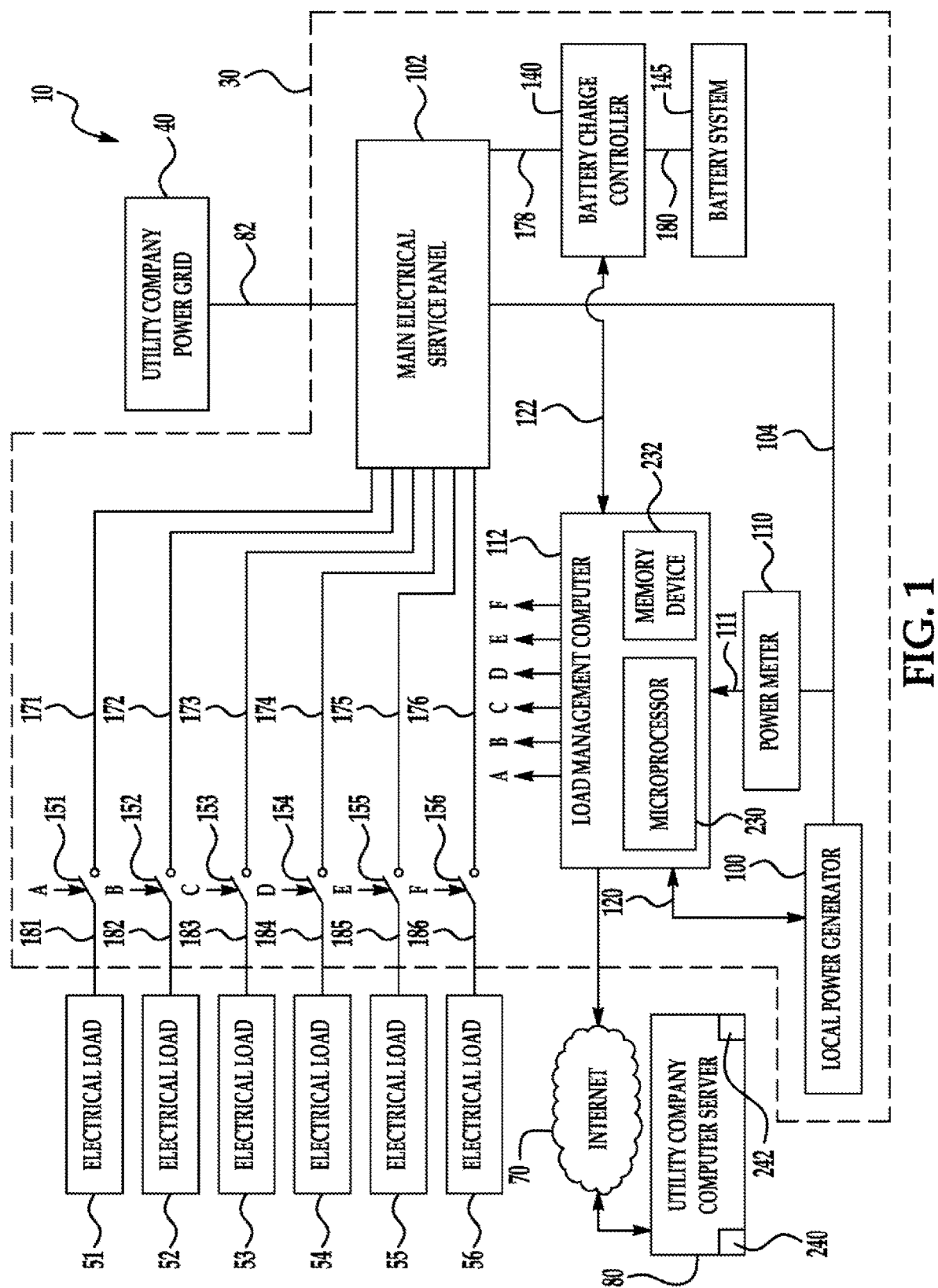
FIG. 1 is a schematic of an electrical power system having an electrical load management system in accordance with an exemplary embodiment.

Referring to FIG. 1, an electrical power system 10 is provided. The electrical power system 10 includes an electrical load management system 30 in accordance with an exemplary embodiment, a utility company power grid 40, electrical loads 51, 52, 53, 54, 55, 56, the Internet 70, a utility company computer server 80, and an electrical line 82.

For purposes of understanding, some of the terms utilized herein will be described.

The term "electrical load" corresponds to any device or component that utilizes electrical power to operate.

The term "high load priority" corresponds to an operational priority of an electrical load that is greater than either a "medium load priority" or a "low load priority."

The term "medium load priority" corresponds to an operational priority of an electrical load that is greater than a "low load priority."

The term "low load priority" corresponds to an operational priority of an electrical load that is a lowest load priority or a load priority that is lower than the "medium load priority."

The term "demand threshold" corresponds to a threshold amount of demanded power from a utility company power grid and which when power from a utility company power grid which when exceeded will result in a predetermined monetary charge by a utility company. In an exemplary embodiment, the demand threshold corresponds to a predetermined amount of kilowatts.

The term "load requirement" refers to whether one or more electrical loads are scheduled to be energized during a predetermined time period which would require electrical power to be utilized to energize the one or more electrical loads.

The term "load request" refers to an amount of electrical power that a predetermined electrical load or electrical loads will require during energization.

The electrical load management system 30 includes a local power generator 100, a main service panel 102, an electrical line 104, a power meter 110, a load management computer 112, communication buses 120, 122, a battery charge controller 140, a battery system 145, controllable power switches 151, 152, 153, 154, 155, 156, electrical lines 171, 172, 173, 174, 175, 176, 178, a conductor 180, and the electrical lines 181, 182, 183, 184, 185, 186. An advantage of the electrical load management system 30 is that the system 30 selects specific electrical loads to be energized from the electrical loads 51, 52, 53, 54, 55, 56 to ensure that a total load request associated with the energized electrical loads is below a demand threshold, utilizing a load priority of each of the electrical loads 51, 52, 53, 54, 55, 56.

Figure 2:
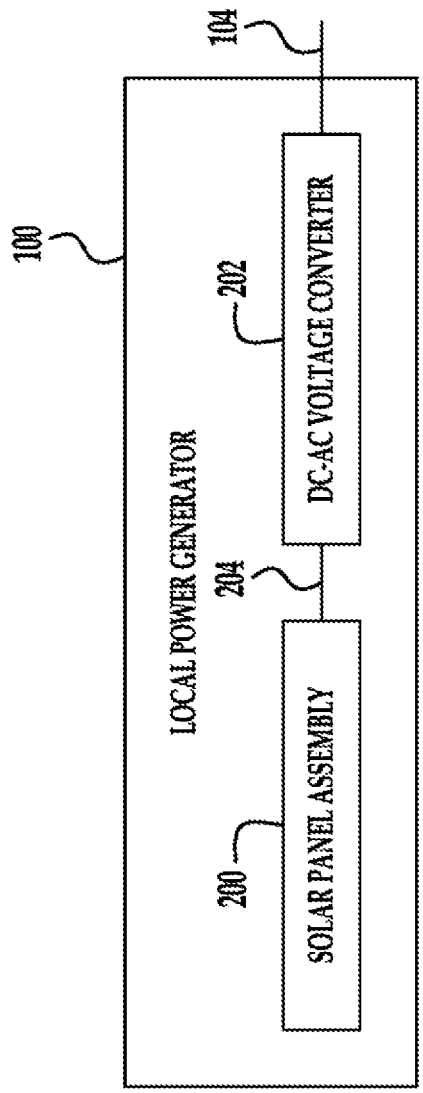
FIG. 2 is a schematic of a local power generator utilized in the electrical power system of FIG. 1.
Figure 3:
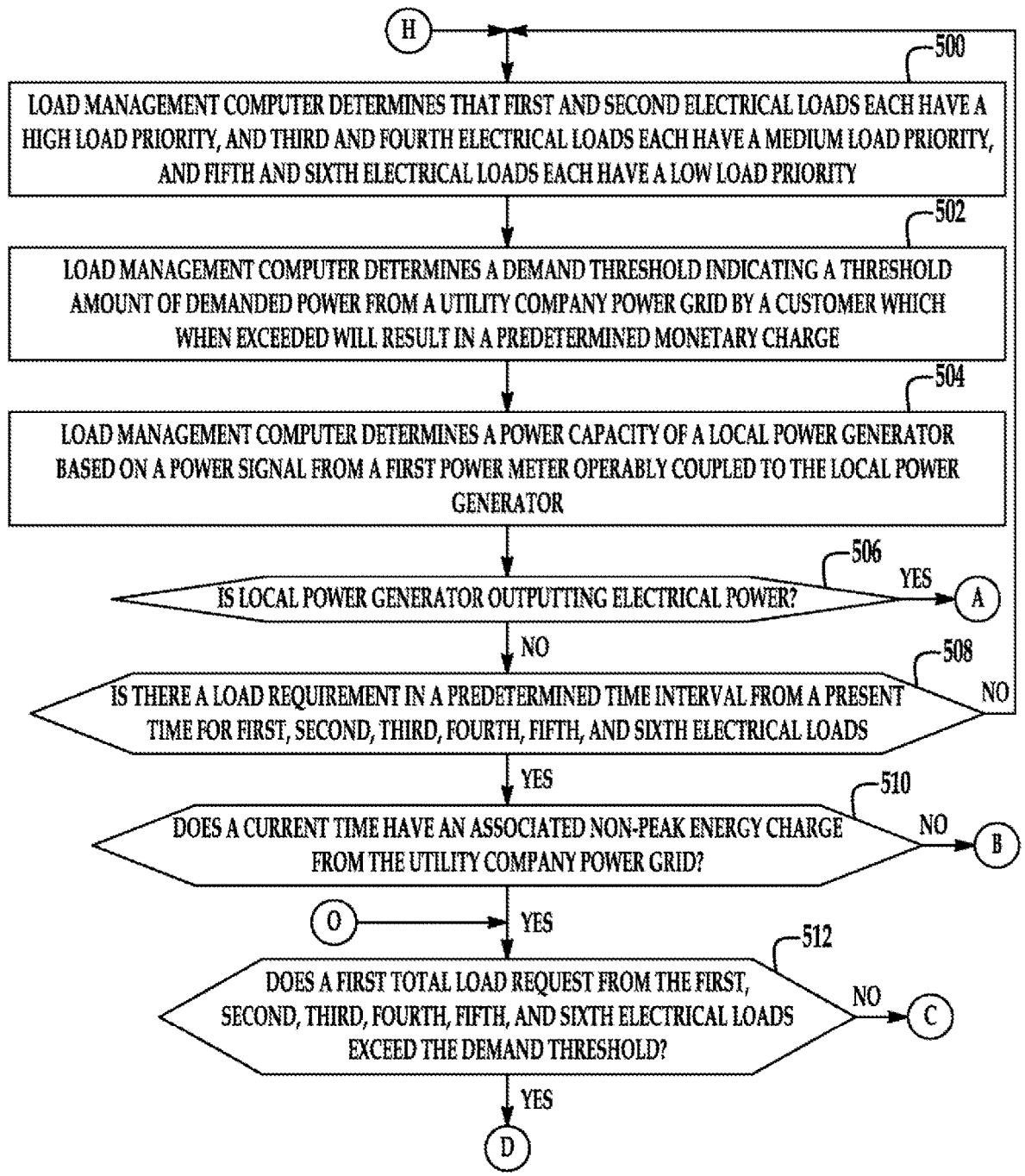
FIGS. 3-28 is a flowchart of a method for controlling first, second, third, fourth, fifth, and sixth electrical loads utilizing the electrical load management system of FIG. 1.
Figure 4:
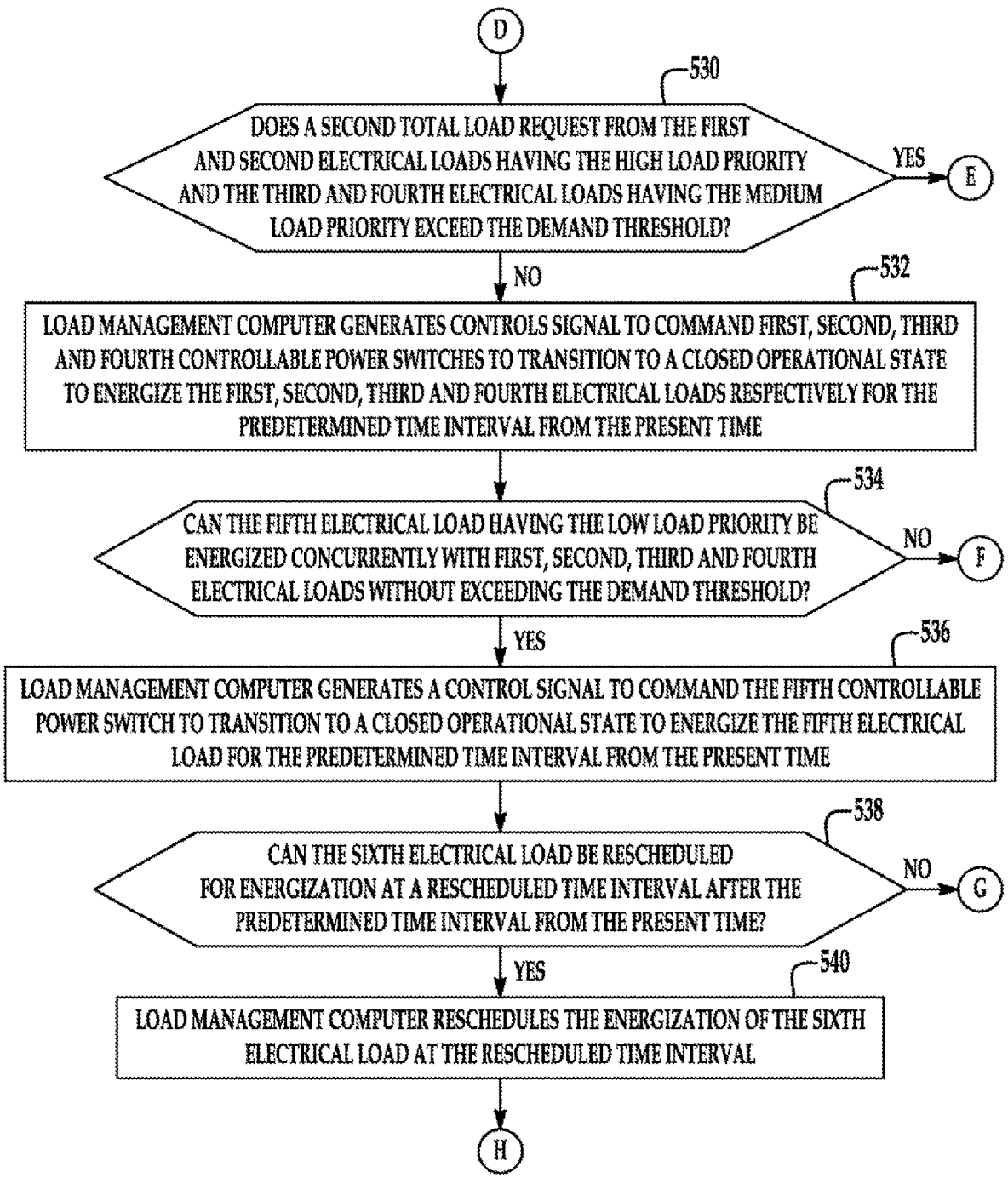

Referring to FIGS. 1 and 2, the local power generator 100 is provided to output electrical power that is utilized to energize the electrical loads 51, 52, 53, 54, 55, 56, and to energize the battery charge controller 140 for charging the battery system 145, and to output electrical power to the utility company power grid 40, if a sufficient amount of excess power is generated. The local power generator 100 is electrically coupled to the main electrical service panel 102 utilizing the electrical line 104. In an exemplary embodiment, the local power generator 100 includes a solar panel assembly 200, a DC-AC voltage converter 202, and a conductor 204. When the solar panel assembly 200 receives sunlight, the solar panel assembly 200 outputs a DC voltage through the conductor 204 to the DC-AC voltage converter 202. The DC-AC voltage converter 202 outputs an AC voltage on the electrical line 104 in response to receiving the DC voltage, such that the AC voltage is received by the main electrical service panel 102. In an alternative embodiment, the local power generator 100 could be at least one of a gasoline power generator, a natural gas power generator, a propane gas power generator, a diesel power generator, and a bio-fuel power generator.

The main electrical service panel 102 is provided to receive electrical power from utility company power grid 40 and from the local power generator 100. Further, the main electrical service panel 102 dispenses electrical power through the controllable power switches 151, 152, 153, 154, 155, 156 to the electrical loads 51, 52, 54, 55, 56, respectively. Still further, the main electrical service panel 102 may dispense electrical power to the battery charge controller 140 from the local power generator 100 when the local power generator 100 is outputting excess electrical power. Still further, the main electrical service panel 102 may dispense electrical power to the utility company power grid 40 when the local power generator 100 is outputting excess electrical power. The main electrical service panel 102 is electrically coupled to the local power generator 100 utilizing the electrical line 104. Also, the main electrical service panel 102 is electrically coupled to the battery charge controller 140 utilizing the electrical line 178. Further, the main electrical service panel 102 is electrically coupled to the utility company power grid 40 utilizing the electrical line 82. Still further, the main electrical service panel 102 is electrically coupled to the controllable power switches 151, 152, 153, 154, 155, 156 utilizing the electrical lines 171, 172, 173, 174, 175, 176, respectively.

The power meter 110 is electrically coupled to the electrical line 104, and to the load management computer 110 utilizing the communication line 111. The power meter 110 outputs a power signal on the communication line 111 that indicates a power capacity of the local power generator 100 at a present time. The power capacity corresponds to the amount of electrical power being output by the local power generator 100 to the main service panel 102. The load management computer 112 receives the power signal and determines the power capacity of local power generator 100 based on the power signal.

The load management computer 112 selects specific electrical loads to be energized from the electrical loads 51, 52, 53, 54, 55, 56 to obtain a total load request associated with the energized electrical loads that is less than a demand threshold, utilizing a load priority of each of the electrical loads 51, 52, 53, 54, 55, 56.

During operation, the load management computer 112 generates control signals (e.g., control signals A, B, C, D, E, F shown in FIG. 1) at a first voltage level to command the controllable power switches 151, 152, 153, 154, 155, 156 to transition to a closed operational state to energize the electrical loads 51, 52, 53, 54, 55, 56, respectively. Alternately, the load management computer 112 generates control signals (e.g., control signals A, B, C, D, E, F shown in FIG. 1) at a second voltage level to command the controllable power switches 151, 152, 153, 154, 155, 156 to transition to an open operational state to de-energize the electrical loads 51, 52, 53, 54, 55, 56, respectively.

In an exemplary embodiment, referring to FIGS. 1 and 29, the load management computer 112 determines the load priorities of the electrical loads 51, 52, 53, 54, 55, 56 by accessing a load priority table 900 stored in the memory device 232. The load priority table 900 has records 901, 902, 903, 904, 905, 906 associated with the electrical loads 51, 52, 53, 54, 55, 56, respectively, wherein each record indicates a load priority of a respective electrical load. The record 901 indicates that the electrical load 51 has a high load priority, and the record 902 indicates that the electrical load 52 has a high load priority. Further, the record 903 indicates that the electrical load 53 has a medium load priority, and the record 904 indicates that the electrical load 54 has a medium load priority. Also, the record 905 indicates that the electrical load 5.5 has a low load priority, and the record 906 indicates that the electrical load 56 has a low load priority.

In an exemplary embodiment, referring to FIGS. 1 and 30, the load management computer 112 determines a load request by accessing a load table 940 stored in the memory device 232. The load table 940 has records 941, 942, 943, 944, 94.5, 946 associated with the electrical loads 51, 52, 53, 54 55, 56, respectively, wherein each record indicates an amount of electrical power utilized to energize each electrical load. The record 941 indicates that the electrical load 51 requires 5,000 watts during energization, and the record 942 indicates that the electrical load 52 requires 500 watts during energization. The record 943 indicates that the electrical load 53 requires 2,000 watts during energization, and the record 944 indicates that the electrical load 54 requires 1,000 watts during energization. The record 945 indicates that the electrical load 55 requires 3,000 watts during energization, and the record 946 indicates that the electrical load 56 requires 500 watts during energization.

Referring to FIG. 1, the load management computer 112 further controls operation of the battery charge controller 140 to either charge the battery system 145 or to extract power from the battery system 145 and to route the electrical power therefrom to the main electrical service panel 102. In particular, the load management computer 112 generates a control message that is sent through the communication bus 122 to the battery charge controller 140 to command the battery charge controller 140 to charge the battery system 145, when the battery system 145 is not fully charged and the local power generator 100 is outputting excess power. Further, the load management computer 112 generates another control message that is sent through the communication bus 122 to the battery charge controller 140 to command the battery charge controller 140 to not charge the battery system 145. Still further, the load management computer 112 generates another control message that is sent through the communication bus 122 to the battery charge controller 140 to command the battery charge controller 140 to extract power from the battery system 145 and to route the electrical power therefrom to the main electrical service panel 102. The battery charge controller 140 communicates with the load management computer 112 utilizing the communication bus 122, and can send a message indicating the charge state (e.g., fully charged state, or not full-charged state) of the battery system 145 to the load management computer 112. The battery charge controller 140 is electrically coupled to the battery system 145 utilizing the conductor 180, and is electrically coupled to the main electrical service panel 102 utilizing the electrical line 178.

Still further, the load management computer 112 determines energy charges associated with the utility company power grid 40 by communicating with the utility computer server 80. In particular, the load management computer 112 sends a request message to the utility company computer server 80 utilizing the Internet 70 or other communication network, to request a table of energy charge rates for predetermined time periods during an upcoming 24-hour time period. In response to the request message, the utility company computer server 80 can send the table of energy charge rates through the Internet to the load management computer 112. The load management computer 112 can determine whether a present time has a peak charge rate or a non-peak charge rate associated with electrical power obtained from the utility company power grid 40, based on the table of energy charge rates.

The load management computer 112 includes a microprocessor 230 and a memory device 232 operably coupled to the microprocessor 230. The microprocessor 230 executes software instructions stored in the memory device 232 and data stored in the memory device 232 to implement the associated steps described in greater detail in the flowcharts herein.

The controllable power switch 151 is electrically coupled in series between the main electrical service panel 102 and the electrical load 51. In particular, the controllable power switch 151 is electrically coupled to the main electrical service panel 102 utilizing the electrical line 171. Further, the controllable power switch 151 is electrically coupled to the electrical load 51 utilizing the electrical line 181. When the controllable power switch 151 receives a control signal at a first voltage level from the load management computer 112 (or a voltage driver coupled between the computer 112 and the switch 151), the controllable power switch 151 transitions to a closed operational state to energize the electrical load 51. Alternately, when the controllable power switch 151 receives a control signal at a second voltage level (e.g., ground voltage level) from the load management computer 112 (or a voltage driver coupled between the computer 112 and the switch 151), the controllable power switch 151 transitions to an open operational state to de-energize the electrical load 51.

The controllable power switch 152 is electrically coupled in series between the main electrical service panel 102 and the electrical load 52. In particular, the controllable power switch 152 is electrically coupled to the main electrical service panel 102 utilizing the electrical line 172. Further, the controllable power switch 152 is electrically coupled to the electrical load 52 utilizing the electrical line 182. When the controllable power switch 152 receives a control signal at a first voltage level from the load management computer 112 (or a voltage driver coupled between the computer 112 and the switch 152), the controllable power switch 152 transitions to a closed operational state to energize the electrical load 52. Alternately, when the controllable power switch 152 receives a control signal at a second voltage level (e.g., ground voltage level) from the load management computer 112 (or a voltage driver coupled between the computer 112 and the switch 152), the controllable power switch 152 transitions to an open operational state to de-energize the electrical load 52.

The controllable power switch 153 is electrically coupled in series between the main electrical service panel 102 and the electrical load 53. In particular, the controllable power switch 153 is electrically coupled to the main electrical service panel 102 utilizing the electrical line 173. Further, the controllable power switch 153 is electrically coupled to the electrical load 53 utilizing the electrical line 183. When the controllable power switch 153 receives a control signal at a first voltage level from the load management computer 112 (or a voltage driver coupled between the computer 112 and the switch 153), the controllable power switch 153 transitions to a closed operational state to energize the electrical load 53. Alternately, when the controllable power switch 153 receives a control signal at a second voltage level (e.g., ground voltage level) from the load management computer 112 (or a voltage driver coupled between the computer 112 and the switch 152), the controllable power switch 153 transitions to an open operational state to de-energize the electrical load 53.

The controllable power switch 154 is electrically coupled in series between the main electrical service panel 102 and the electrical load 54. In particular, the controllable power switch 154 is electrically coupled to the main electrical service panel 102 utilizing the electrical line 174. Further, the controllable power switch 154 is electrically coupled to the electrical load 54 utilizing the electrical line 184. When the controllable power switch 154 receives a control signal at a first voltage level from the load management computer 112 (or a voltage driver coupled between the computer 112 and the switch 154), the controllable power switch 154 transitions to a closed operational state to energize the electrical load 54. Alternately, when the controllable power switch 154 receives a control signal at a second voltage level (e.g., ground voltage level) from the load management computer 112 (or a voltage driver coupled between the computer 112 and the switch 154), the controllable power switch 154 transitions to an open operational state to de-energize the electrical load 54.

The controllable power switch 155 is electrically coupled in series between the main electrical service panel 102 and the electrical load 55. In particular, the controllable power switch 155 is electrically coupled to the main electrical service panel 102 utilizing the electrical line 175. Further, the controllable power switch 155 is electrically coupled to the electrical load 55 utilizing the electrical line 185. When the controllable power switch 155 receives a control signal at a first voltage level from the load management computer 112 (or a voltage driver coupled between the computer 112 and the switch 155), the controllable power switch 155 transitions to a closed operational state to energize the electrical load 55. Alternately, when the controllable power switch 155 receives a control signal at a second voltage level (e.g., ground voltage level) from the load management computer 112 (or a voltage driver coupled between the computer 112 and the switch 155), the controllable power switch 155 transitions to an open operational state to de-energize the electrical load 55.

The controllable power switch 156 is electrically coupled in series between the main electrical service panel 102 and the electrical load 56. In particular, the controllable power switch 156 is electrically coupled to the main electrical service panel 102 utilizing the electrical line 176. Further, the controllable power switch 156 is electrically coupled to the electrical load 56 utilizing the electrical line 186. When the controllable power switch 156 receives a control signal at a first voltage level from the load management computer 112 (or a voltage driver coupled between the computer 112 and the switch 156), the controllable power switch 156 transitions to a closed operational state to energize the electrical load 56. Alternately, when the controllable power switch 156 receives a control signal at a second voltage level (e.g., ground voltage level) from the load management computer 112 (or a voltage driver coupled between the computer 112 and the switch 156), the controllable power switch 156 transitions to an open operational state to de-energize the electrical load 56.

The utility company computer server 80 includes a microprocessor 240 and a memory device 242. The utility company computer server 80 operably communicates with the load management computer 112 utilizing the Internet 70 or other communication network.

Referring to FIGS. 1 and 3-28, a flowchart of a method for controlling operation of the electrical loads 51, 52, 53, 54, 55, 56 in accordance with another exemplary embodiment will now be described.

At step 500, the load management computer 112 determines that the electrical loads 51, 52 each have a high load priority, and the electrical loads 53, 54 each have a medium load priority, and the electrical loads 55, 56 each have a low load priority. After step 500, the method advances to step 502.

At step 502, the load management computer 112 determines a demand threshold indicating a threshold amount of demanded power from a utility company power grid 40 by a customer which when exceeded will result in a predetermined monetary charge. After step 502, the method advances to step 504.

At step 504, the load management computer 112 determines a power capacity of a local power generator 100 based on a power signal from a power meter 110 operably coupled to the local power generator 100. After step 504, the method advances to step 506.

At step 506, the load management computer 112 makes a determination as to whether the local power generator 100 is outputting electrical power. If the value of step 506 equals "yes", the method advances to step 674 (shown in FIG. 16). Otherwise, the method advances to step 508.

At step 508, the load management computer 112 makes a determination as to whether there is a load requirement in a predetermined time interval from a present time for the electrical loads 51, 52, 53, 54, 55, 56. If the value of step 508 equals "yes", the method advances to step 510. Otherwise, the method returns to step 500.

At step 510, the load management computer 112 makes a determination as to whether a current time has an associated non-peak energy charge from the utility company power grid 40. If the value of step 510 equals "yes", the method advances to step 512. Otherwise, the method advances to step 670 (shown in FIG. 15).

At step 512, the load management computer 112 makes a determination as to whether a first total load request from the electrical loads 51, 52, 53, 54, 55, 56 exceeds the demand threshold. If the value of step 512 equals "yes", the method advances to step 530. Otherwise, the method advances to step 658 (shown in FIG. 14).

At step 530, the load management computer 112 makes a determination as to whether a second total load request from the electrical loads 51, 52 having the high load priority and the electrical loads 53, 54 having the medium load priority exceed the demand threshold. If the value of step 530 equals "yes", the method advances to step 568 (shown in FIG. 7). Otherwise, the method advances to step 532.

At step 532, the load management computer 112 generates controls signal to command the controllable power switches 151, 152, 153, 154 to transition to a closed operational state to energize the electrical loads 51, 52, 53, 54, respectively, for the predetermined time interval from the present time. After step 532, the method advances to step 534.

At step 534, the load management computer 112 makes a determination as to whether the electrical load 55 having the low load priority can be energized concurrently with electrical loads 51, 52, 53, 54 without exceeding the demand threshold. If the value of step 534 equals "yes", the method advances to step 536. Otherwise, the method advances to step 562 (shown in FIG. 6).

At step 536, the load management computer 112 generates a control signal to command the controllable power switch 155 to transition to a closed operational state to energize the electrical load 55 for the predetermined time interval from the present time. After step 536, the method advances to step 538.

At step 538, the load management computer 112 makes a determination as to whether the electrical load 56 be rescheduled for energization at a rescheduled time interval after the predetermined time interval from the present time. If the value of step 538 equals "yes", the method advances to step 540. Otherwise, the method advances to step 560 (shown in FIG. 5).

At step 540, the load management computer 112 reschedules the energization of the electrical load 56 at the rescheduled time interval. After step 540, the method advances to step 500 (shown in FIG. 3).

Figure 5:
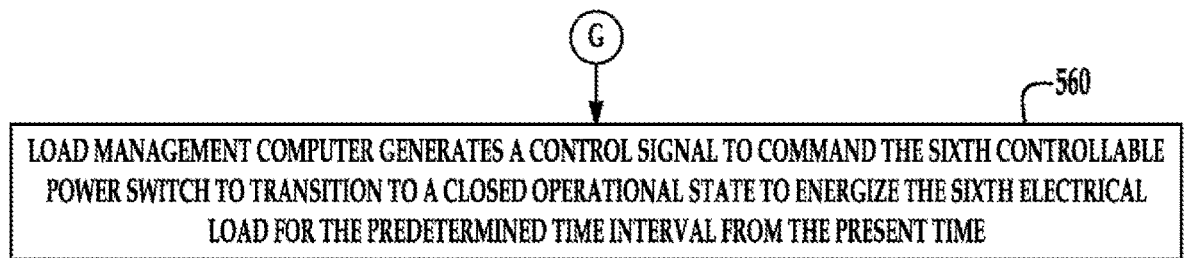

Referring again to step 538, if the value of step 538 equals "no", the method advances to step 560 (shown in FIG. 5). At step 560, the load management computer 112 generates a control signal to command the controllable power switch 186 to transition to a closed operational state to energize the electrical load 56 for the predetermined time interval from the present time. After step 560, the method returns to step 500 (shown in FIG. 3).

Figure 6:
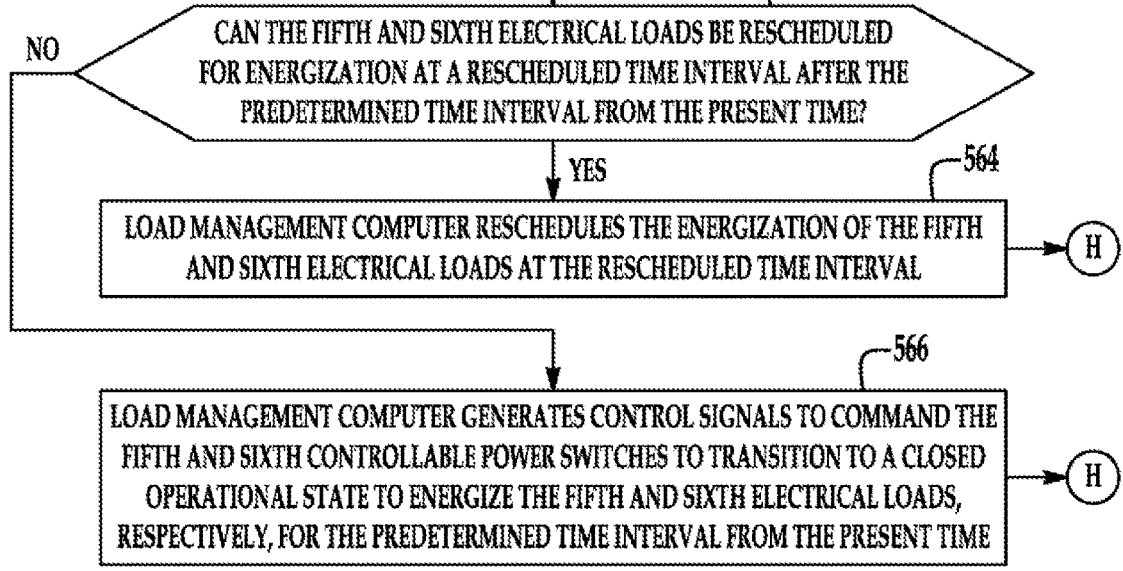

Referring again to step 534 (shown in FIG. 4), if the value of step 534 equals "no", the method advances to step 562 (shown in FIG. 6). At step 562, the load management computer 112 makes a determination as to whether the electrical loads 55, 56 can be rescheduled for energization at a rescheduled time interval after the predetermined time interval from the present time. If the value of step 562 equals "yes", the method advances to step 564. Otherwise, the method advances to step 566.

At step 564, the load management computer 112 reschedules the energization of the electrical loads 55, 56 at the rescheduled time interval. After step 564, the method returns to step 500 (shown in FIG. 3).

Referring again to step 562, if the value of step 562 equals "no", the method advances to step 566. At step 566, the load management computer 112 generates control signals to command the controllable power switches 155, 156 to transition to a closed operational state to energize the electrical loads 55, 56, respectively, for the predetermined time interval from the present time. After step 566, the method returns to step 500 (shown in FIG. 3).

Figure 7:
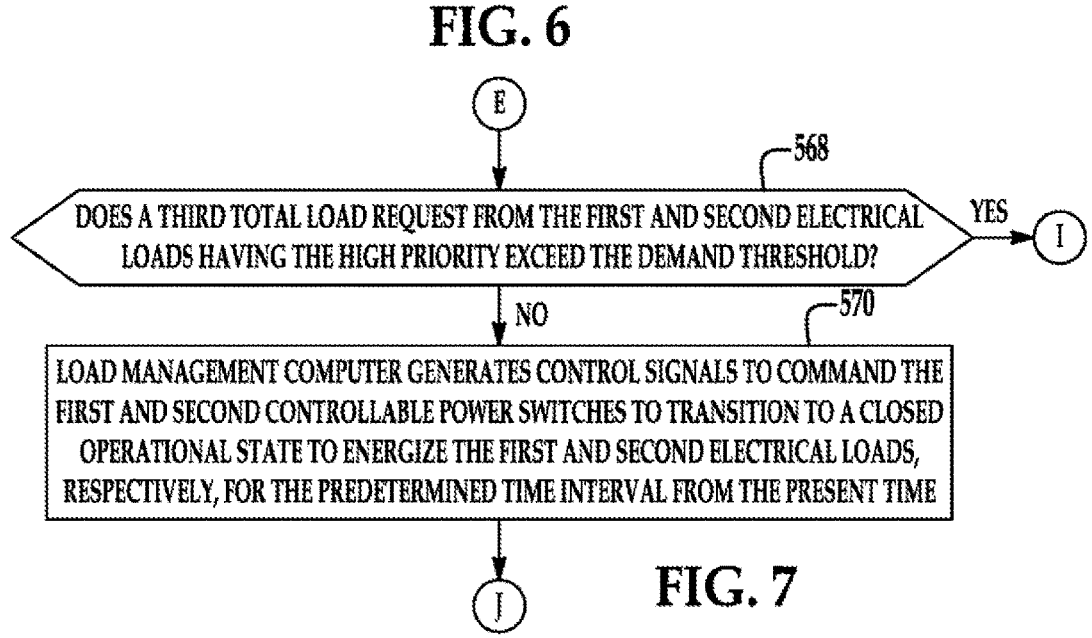
Figure 8:
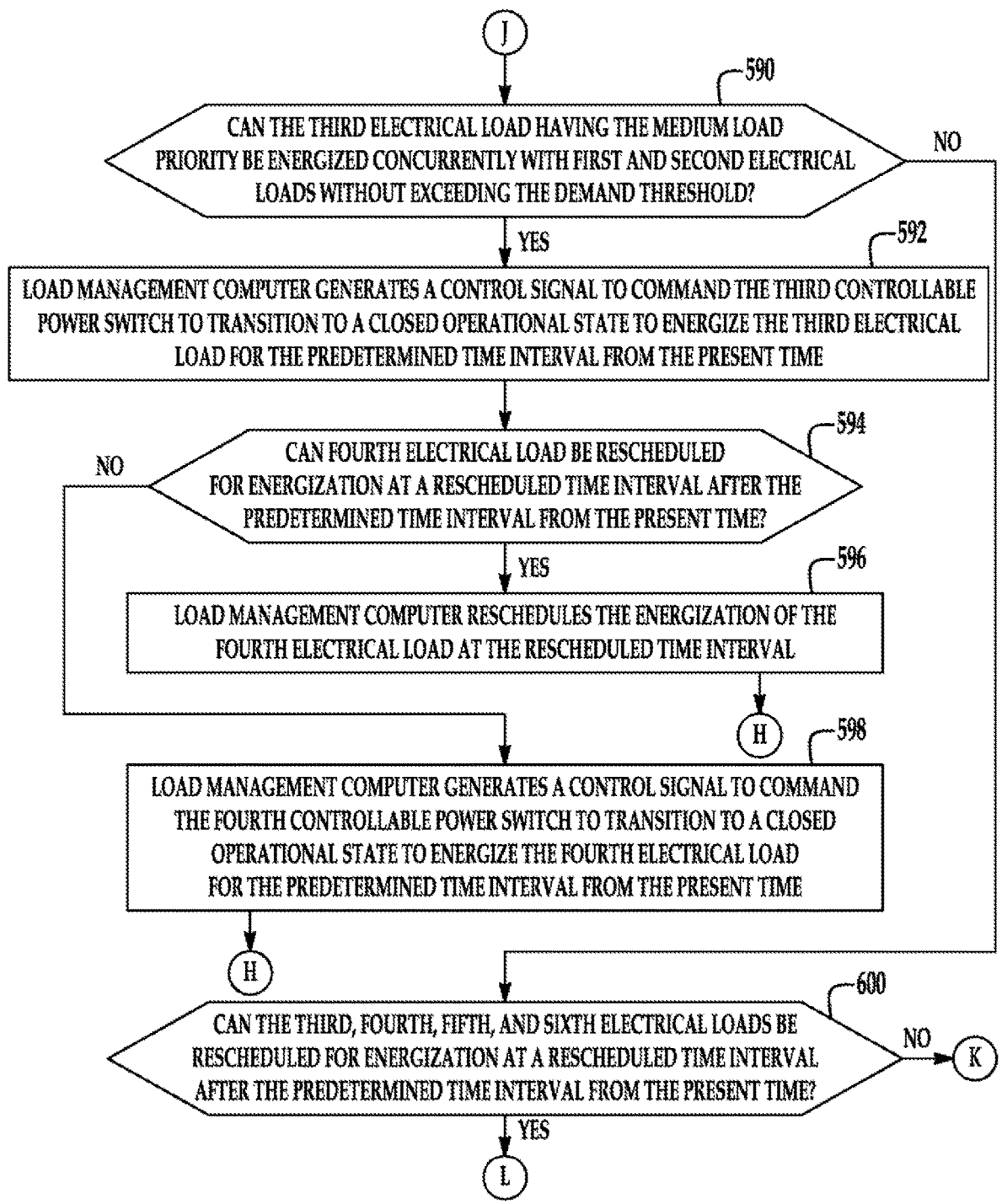
Figure 9:
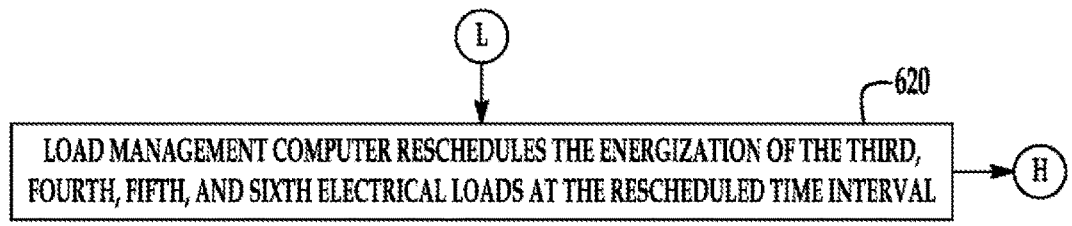
Figure 10:
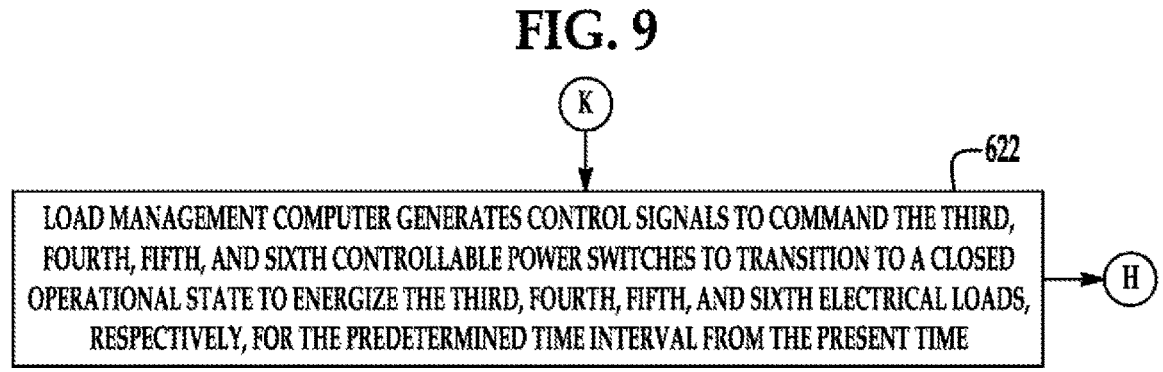
Figure 11:
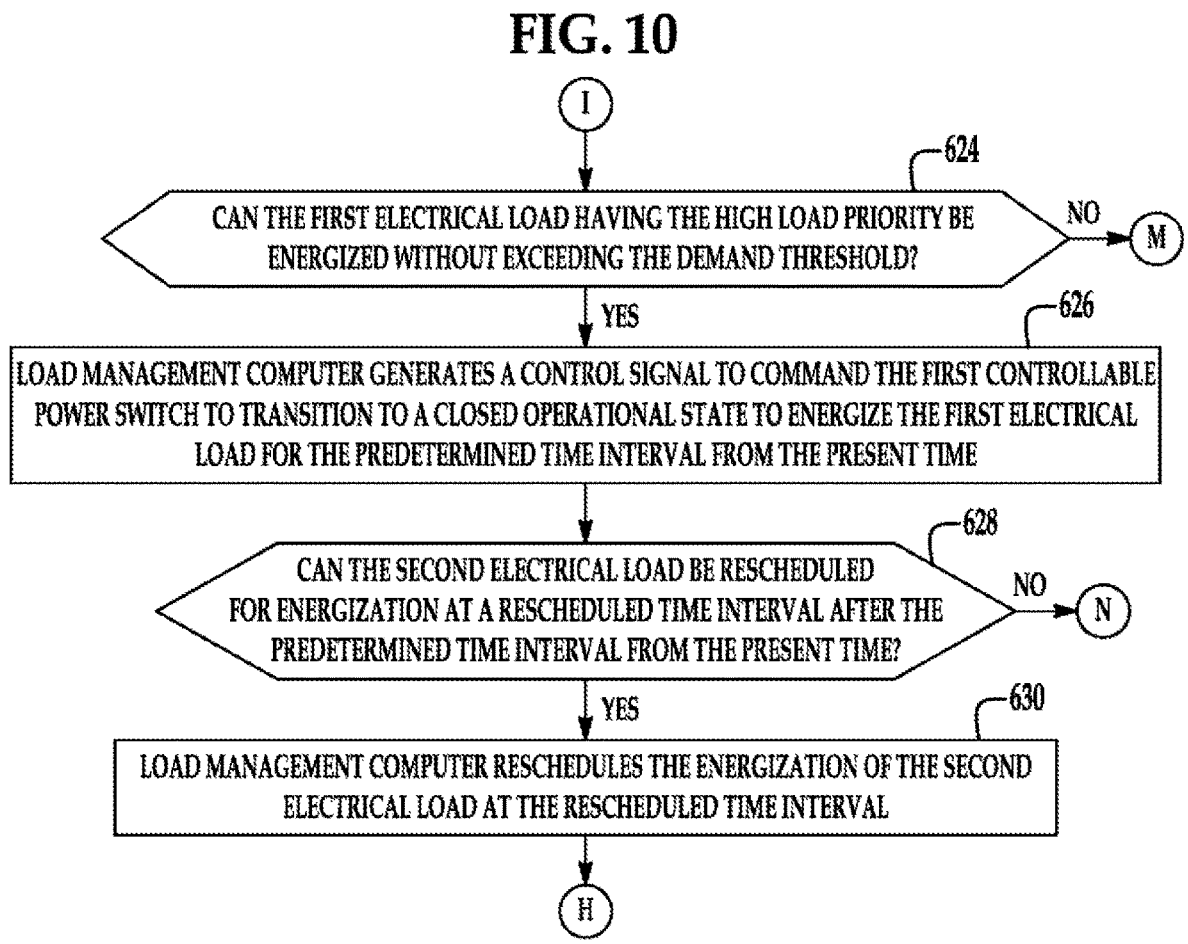
Figure 12:
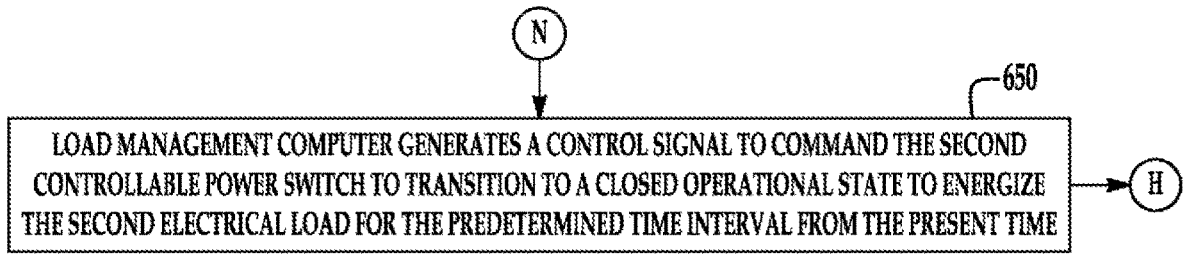
Figure 13:
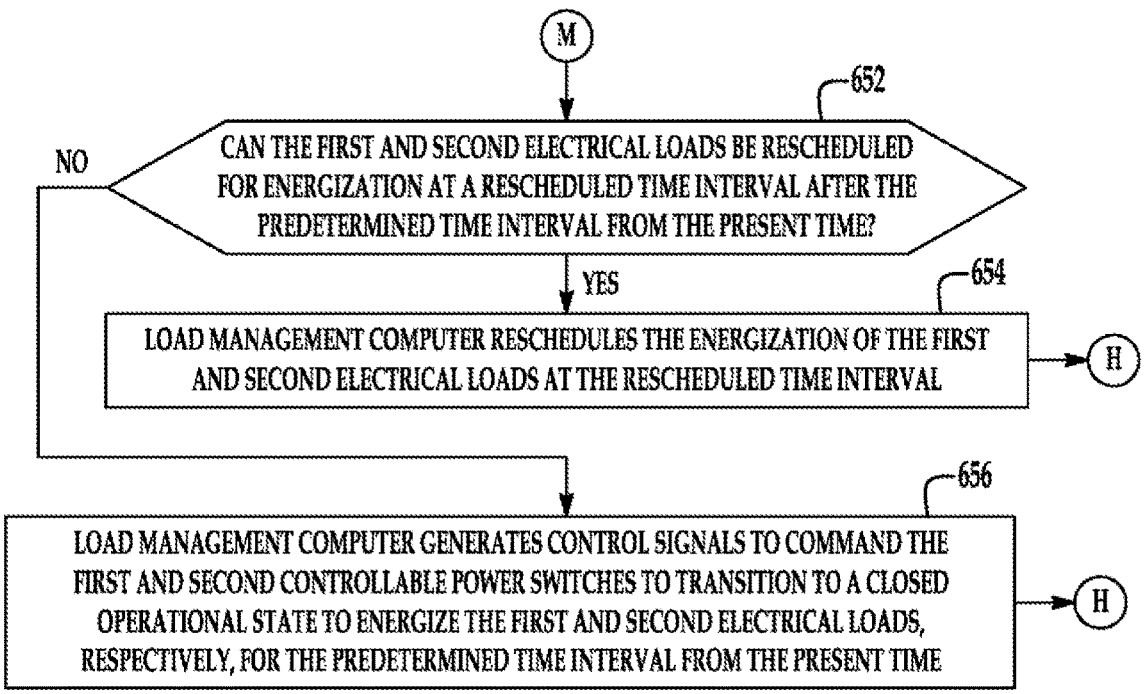
Figure 14:
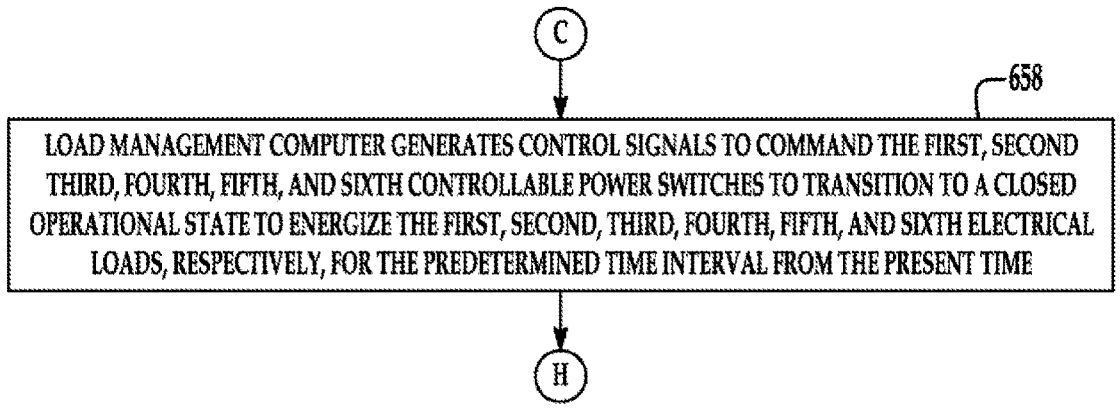

Referring again to step 530 (shown in FIG. 4), if the value of step 530 equals "yes", the method advances to step 568 (shown in FIG. 7). At step 568, the load management computer 112 makes a determination as to whether a third total load request from the electrical loads 51, 52 having the high load priority exceeds the demand threshold. If the value of step 568 equals "yes", the method advances to step 624 (shown in FIG. 11). Otherwise, the method advances to step 570.

At step 570, the load management computer 112 generates control signals to command the controllable power switches 151, 152 to transition to a closed operational state to energize the electrical loads 51, 52, respectively, for the predetermined time interval from the present time. After step 570, the method advances to step 590.

At step 590, the load management computer makes a determination as to whether the electrical load 53 having the medium load priority can be energized concurrently with electrical loads 51, 52 without exceeding the demand threshold. If the value of step 590 equals "yes", the method advances to step 592. Otherwise, the method advances to step 600.

At step 592, the load management computer 112 generates a control signal to command the controllable power switch 153 to transition to a closed operational state to energize the electrical load 53 for the predetermined time interval from the present time. After step 592, the method advances to step 594.

At step 594, the load management computer 112 makes a determination as to whether the electrical load 54 and be rescheduled for energization at a rescheduled time interval after the predetermined time interval from the present time. If the value of step 594 equals "yes", the method advances to step 596. Otherwise, the method advances to step 598.

At step 596, the load management computer 112 reschedules the energization of the electrical load 54 at the rescheduled time interval. After step 596, the method returns to step 500 (shown in FIG. 3).

Referring again to step 594, if the value of step 594 equals "no", the method advances to step 598. At step 598, the load management computer 112 generates a control signal to command the controllable power switch 154 to transition to a closed operational state to energize the electrical load 54 for the predetermined time interval from the present time. After step 598, the method returns to step 500 (shown in FIG. 3).

Referring again to step 590, if the value of step 590 equals "no", the method advances to step 600. At step 600, the load management computer 112 makes a determination as to whether the electrical loads 53, 54, 55, 56 can be rescheduled for energization at a rescheduled time interval after the predetermined time interval from the present time. If the value of step 600 equals "yes", the method advances to step 620 (shown in FIG. 9). Otherwise, the method advances to step 622 (shown in FIG. 10).

At step 620, the load management computer 112 reschedules the energization of the electrical loads 53, 54, 55, 56 at the rescheduled time interval. After step 620, the method returns the step 500 (shown in FIG. 3).

Referring again to step 600, if the value of step 600 equals "no", the method advances to step 622. At step 622, the load management computer 112 generates control signals to command the controllable power switches 153, 154, 155, 156 to transition to a closed operational state to energize the electrical loads 53, 54, 55, 56, respectively, for the predetermined time interval from the present time. After step 622, the method returns the step 500 (shown in FIG. 3).

Referring again to step 568, if the value of step 568 equals "yes", the method advances to step 624. At step 624, the load management computer 112 makes a determination as to whether the electrical load 51 having the high load priority can be energized without exceeding the demand threshold. If the value of step 624 equals "yes", the method advances to step 626. Otherwise, the method advances to step 652 (shown in FIG. 13.

At step 626, the load management computer 112 generates a control signal to command the controllable power switch 151 to transition to a closed operational state to energize the electrical load 51 for the predetermined time interval from the present time. After step 626, the method advances to step 628.

At step 628, the load management computer 112 makes a determination as to whether the electrical load 52 can be rescheduled for energization at a rescheduled time interval after the predetermined time interval from the present time. If the value of step 628 equals "yes", the method advances to step 630. Otherwise, the method advances to step 650 (shown in FIG. 12).

At step 630, the load management computer 112 reschedules the energization of the electrical load 52 at the rescheduled time interval. After step 630, the method returns to step 500 (shown in FIG. 3).

Referring again to step 628, if the value of step 628 equals "no", the method advances to step 650. At step 650, the load management computer 112 generates a control signal to command the controllable power switch 152 to transition to the closed operational state to energize the electrical load 52 for the predetermined time interval from the present time. After step 650, the method returns to step 500 (shown in FIG. 3).

Referring again to step 624 (shown in FIG. 11), if the value of step 624 equals "no", the method advances to step 652. At step 652, the load management computer 112 makes a determination as to whether the electrical loads 51, 52 can be rescheduled for energization at a rescheduled time interval after the predetermined time interval from the present time. If the value of step 652 equals "yes", the method advances to step 654. Otherwise, the method advances to step 656.

At step 654, the load management computer 112 reschedules the energization of the electrical loads 51, 52 at the rescheduled time interval. After step 654, the method returns to step 500 (shown in FIG. 3).

Referring again to step 652, if the value of step 652 equals "no", the method advances to step 656. At step 656, the load management computer 112 generates control signals to command the controllable power switches 151, 152 to transition to the closed operational state to energize the electrical loads 51, 52, respectively, for the predetermined time interval from the present time. After step 656, the method returns to step 500 (shown in FIG. 3).

Referring again to step 512 (shown in FIG. 3), if the value of step 512 equals "no", the method advances to step 658. At step 658, the load management computer 112 generates control signals to command the controllable power switches 151, 152, 153, 154, 155, 156 to transition to a closed operational state to energize the electrical loads 51, 52, 53, 54, 55, 56, respectively, for the predetermined time interval from the present time. After step 658, the method returns to step 500 (shown in FIG. 3).

Figure 15:
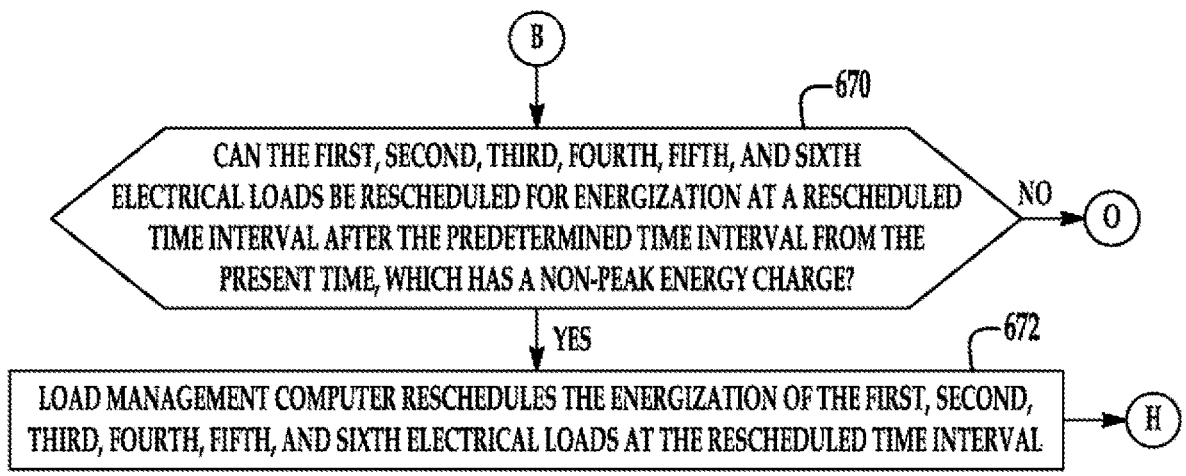

Referring again to step 510 (shown in FIG. 3), if the value of step 510 equals "no", the method advances to step 670 (shown in FIG. 15). At step 670, the load management computer 112 makes a determination as to whether the electrical loads 51, 52, 53, 54, 55, 56 and be rescheduled for energization at a rescheduled time interval after the predetermined time interval from the present time-which has a non-peak energy charge. If the value of step 670 equals "yes", the method advances to step 672. Otherwise, the method returns to step 512 (shown in FIG. 3).

At step 672, the load management computer 112 reschedules the energization of the electrical loads 51, 52, 53, 54, 55, 56 at the rescheduled time interval. After step 672, the method returns the step 500 (shown in FIG. 3).

Figure 16:
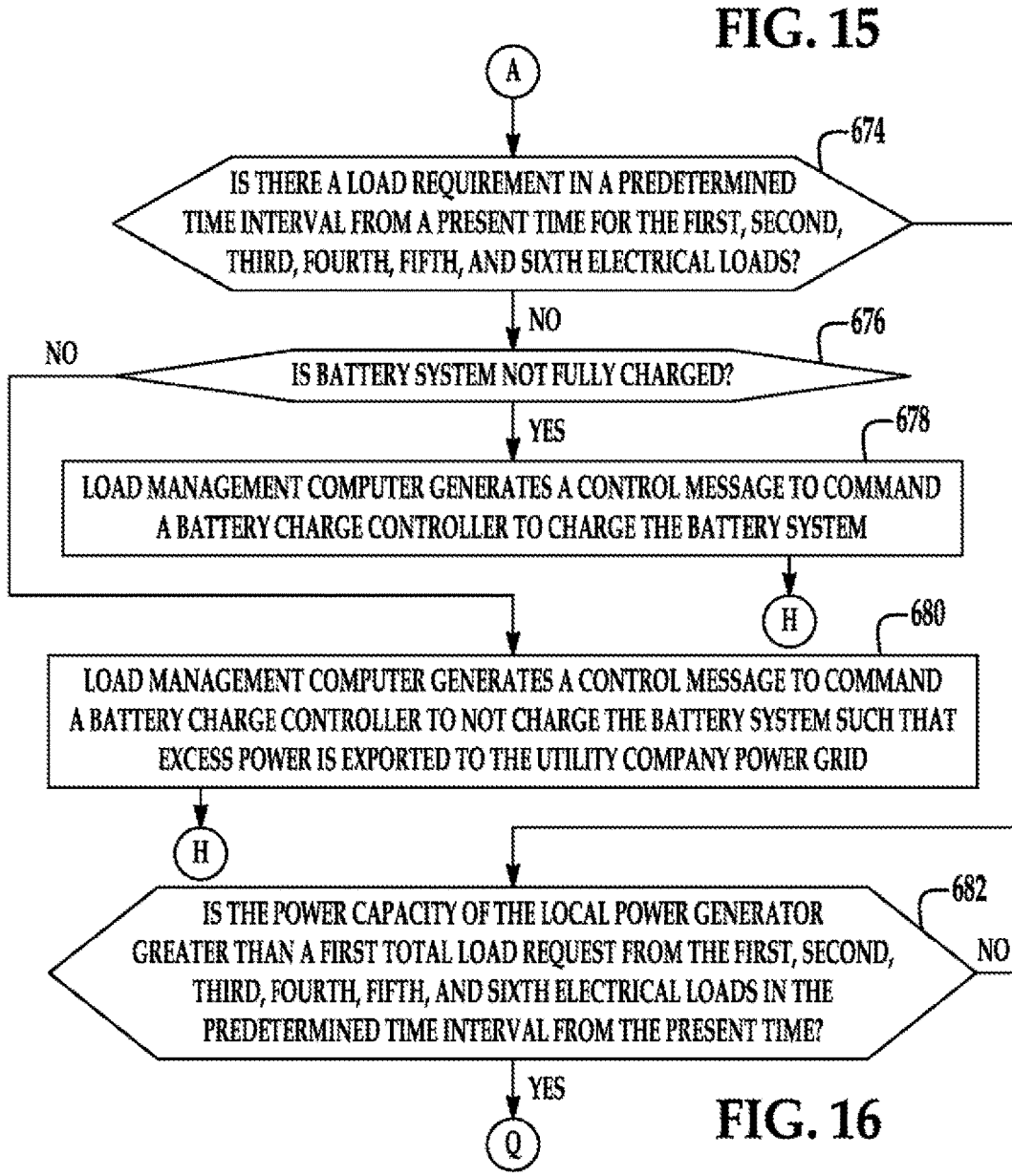
Figure 17:
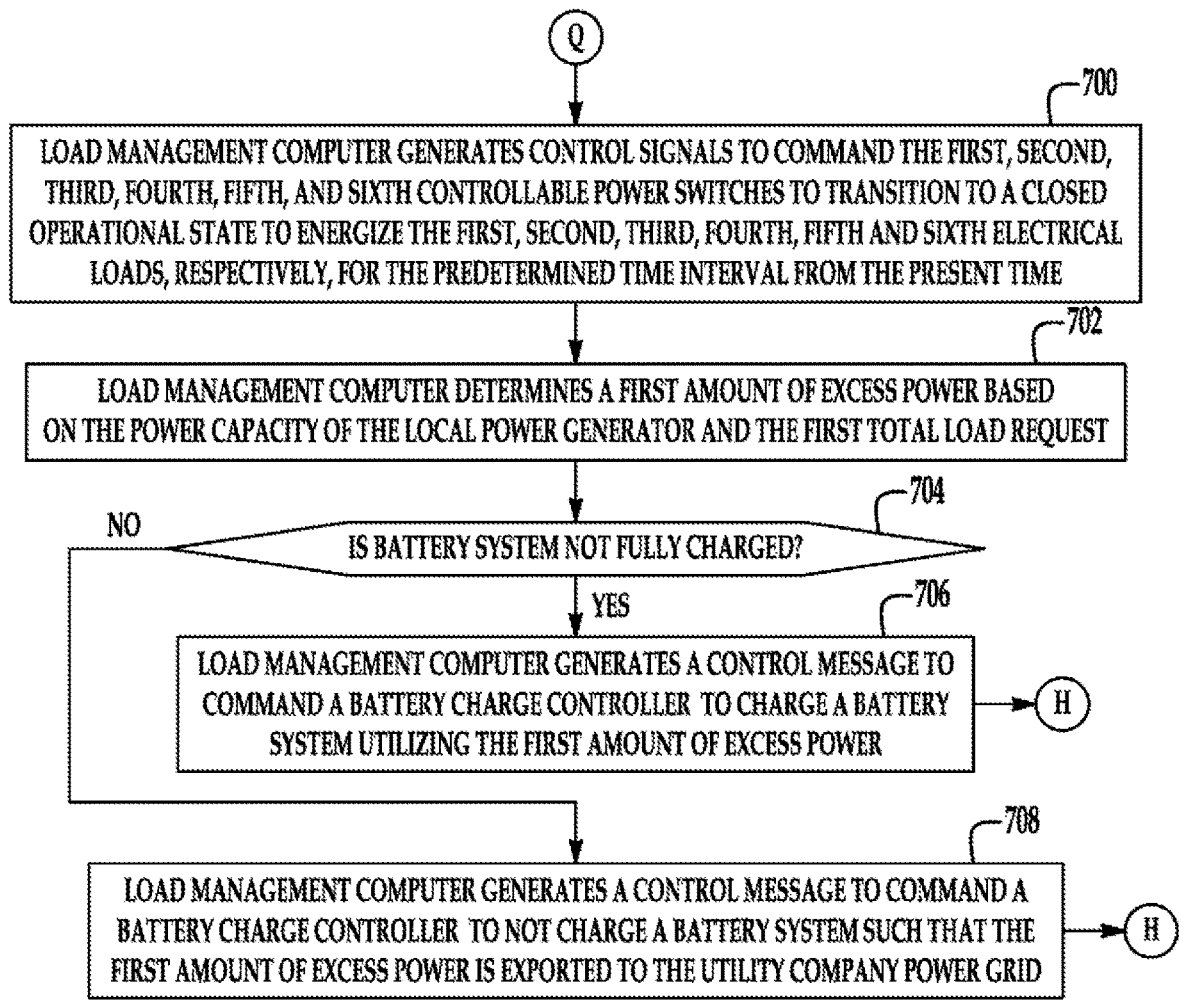
Figure 18:
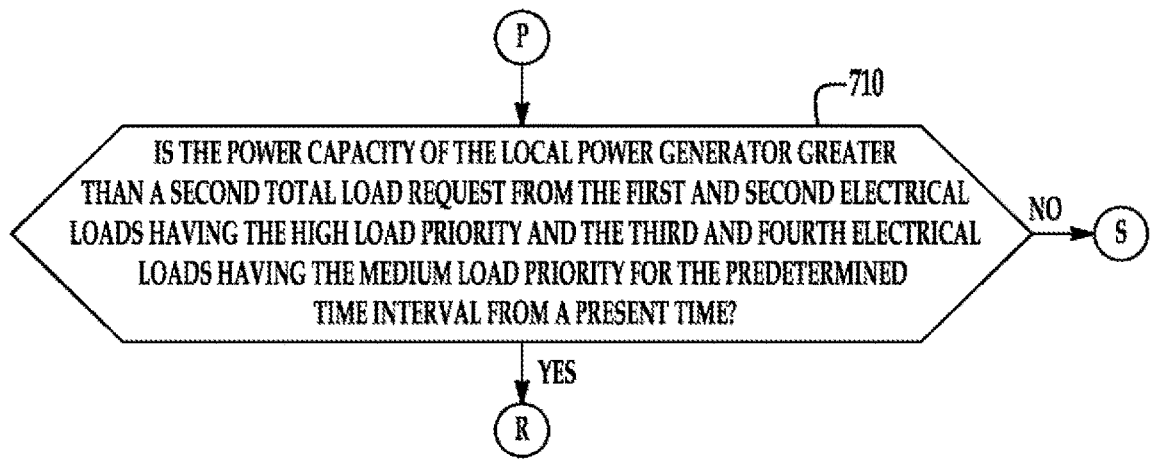
Figure 19:
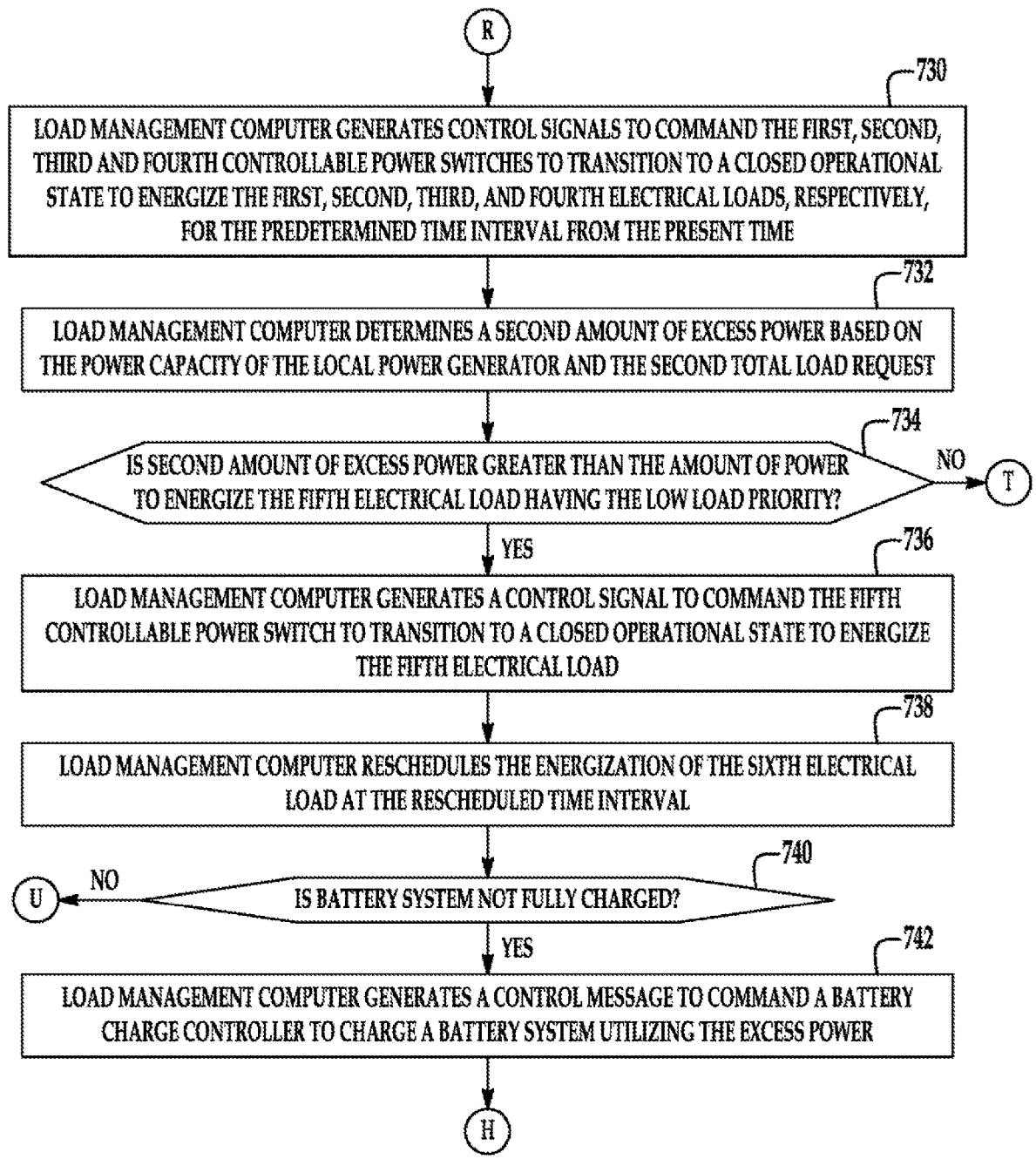

Referring again to step 506 (shown in FIG. 3), if the value of step 506 equals "yes", the method advances to step 674 (shown in FIG. 16). At step 674, the load management computer 112 makes a determination as to whether there is a load requirement in a predetermined time interval from a present time for the electrical loads 51, 52, 53, 54, 55, 56. If the value of step 674 equals "yes", the method advances to step 682. Otherwise, the method advances to step 676.

At step 676, the load management computer 112 makes a determination as to whether a battery system 145 is not fully charged. If the value of step 676 equals "yes", the method advances to step 678. Otherwise, the method advances to step 680.

At step 678, the load management computer 112 generates a control message to command a battery charge controller 140 to charge the battery system 145. After step 678, the method returns to step 500 (shown in FIG. 3).

Referring again to step 676, if the value of step 676 equals "no", the method advances to step 680. At step 680, the load management computer 112 generates a control message to command a battery charge controller 140 to not charge the battery system 145 such that excess power is exported to the utility company power grid 40. After step 680, the method returns to step 500 (shown in FIG. 3).

Referring again to step 674, if the value of step 674 equals "yes", the method advances to step 682. At step 682, the load management computer 112 makes a determination as to whether the power capacity of the local power generator 100 is greater than a first total load request from the electrical loads 51, 52, 53, 54, 55, 56 in the predetermined time interval from the present time. If the value of step 682 equals "yes", the method advances to step 700 (shown in FIG. 17). Otherwise, the method advances to step 710 (shown in FIG. 18).

At step 700, the load management computer 112 generates control signals to command the controllable power switches 151, 152, 153, 154, 155, 156 to transition to a closed operational state to energize the electrical loads 51, 52, 53, 54, 55, 56, respectively, for the predetermined time interval from the present time. After step 700, the method advances to step 702. However, it should be obvious to one of ordinary skill in the art from the disclosure hereinabove that the load management computer 112 may also make adjustments to the electrical loads 52, 52, 53, 54, 55, 56. For example, given electrical load may have a maximum demand for electrical energy based upon records 901, 902, 903, 904, 905, 906 associated with each of the electrical loads. The load management computer 112 can increase a maximum electrical load of any of the electrical loads 52, 52, 53, 54, 55, 56 from the records identifying maximum electrical load. In this manner, excess electrical energy may be transmitted to the electrical load 52, 52, 53, 54, 55, 56 above a maximum indicated by the records 901, 902, 903, 904, 905, 906. By way of non-limiting example, a given electrical load record may be a temperature of an office that is set to 70° F. The load management computer 112 will lower the temperature demand of the room to, for example, 68° F. and affect transmission of excess electrical energy to the room electrical load. This is particularly favorable when the battery system 145 is fully charged and it is not economical to transmit excess electrical energy to the utility company power grid 40. Thus, the load management computer 112 determines whether it is more efficient to raise the maximum electrical energy allocation at one or more electrical loads 52, 52, 53, 54, 55, 56 or to transfer excess energy to the utility company power grid 40.

At step 702, the load management computer 112 determines a first amount of excess power based on the power capacity of the local power generator 100 and the first total load request. After step 702, the method advances to step 704.

At step 704, the load management computer 112 makes a determination as to whether the battery system 145 is not fully charged. If the value of step 704 equals "yes", the method advances to step 706. Otherwise, the method advances to step 708.

At step 706, the load management computer 112 generates a control message to command a battery charge controller 140 to charge a battery system 145 utilizing the first amount of excess power. After step 706, the method returns to step 500 (shown in FIG. 3).

Referring again to step 704, if the value of step 704 equals "no", the method advances to step 708. At step 708, the load management computer 112 generates a control message to command a battery charge controller 140 to not charge the battery system 145 such that the first amount of excess power is exported to the utility company power grid 40. After step 708, the method returns to step 500 (shown in FIG. 3).

Referring again to step 682 (shown in FIG. 16), if the value of step 682 equals "no", the method advances to step 710. At step 710, the load management computer 112 makes a determination as to whether the power capacity of the local power generator 100 is greater than a second total load request from the electrical loads 51, 52 having the high load priority and the electrical loads 53, 54 having the medium load priority for the predetermined time interval from a present time. If the value of step 710 equals "yes", the method advances to step 730. Otherwise, the method advances to step 770 (shown in FIG. 22).

At step 730, the load management computer 112 generates control signals to command the controllable power switches 151, 152, 153, 154 to transition to a closed operational state to energize the electrical loads 51, 52, 53, 54, respectively, for the predetermined time interval from the present time. After step 730, the method advances to step 732.

At step 732, the load management computer 112 determines a second amount of excess power based on the power capacity of the local power generator 100 and the second total load request. After step 732, the method advances to step 734.

At step 734, the load management computer 112 makes a determination as to whether a second amount of excess power is greater than an amount of power to energize the electrical load 55 having the low load priority. If the value of step 734 equals "yes", the method advances to step 736. Otherwise, the method advances to step 762 (shown in FIG. 21).

At step 736, the load management computer 112 generates a control signal to command the controllable power switch 155 to transition to a closed operational state to energize the electrical load 55. After step 736, the method advances to step 738.

At step 738, the load management computer 112 reschedules the energization of the electrical load 56 at the rescheduled time interval. After step 738, the method advances to step 740.

At step 740, the load management computer 112 makes a determination as to whether the battery system 145 is not fully charged. If the value of step 740 equals "yes", the method advances to step 742. Otherwise, the method advances to step 760 (shown in FIG. 20).

At step 742, the load management computer 112 generates a control message to command a battery charge controller 140 to charge a battery system 145 utilizing the excess power. After step 742, the method returns to step 500 (shown in FIG. 3).

Figure 20:
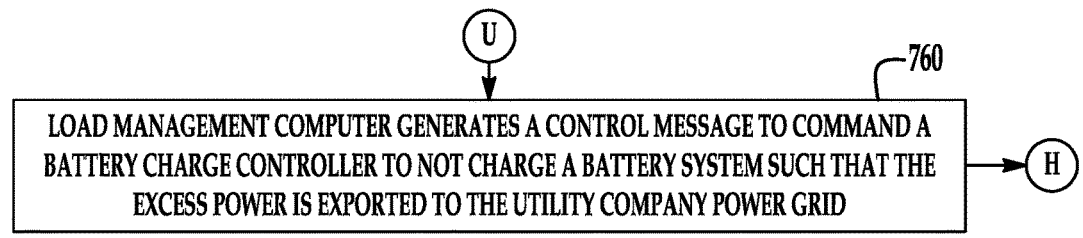
Figure 21:
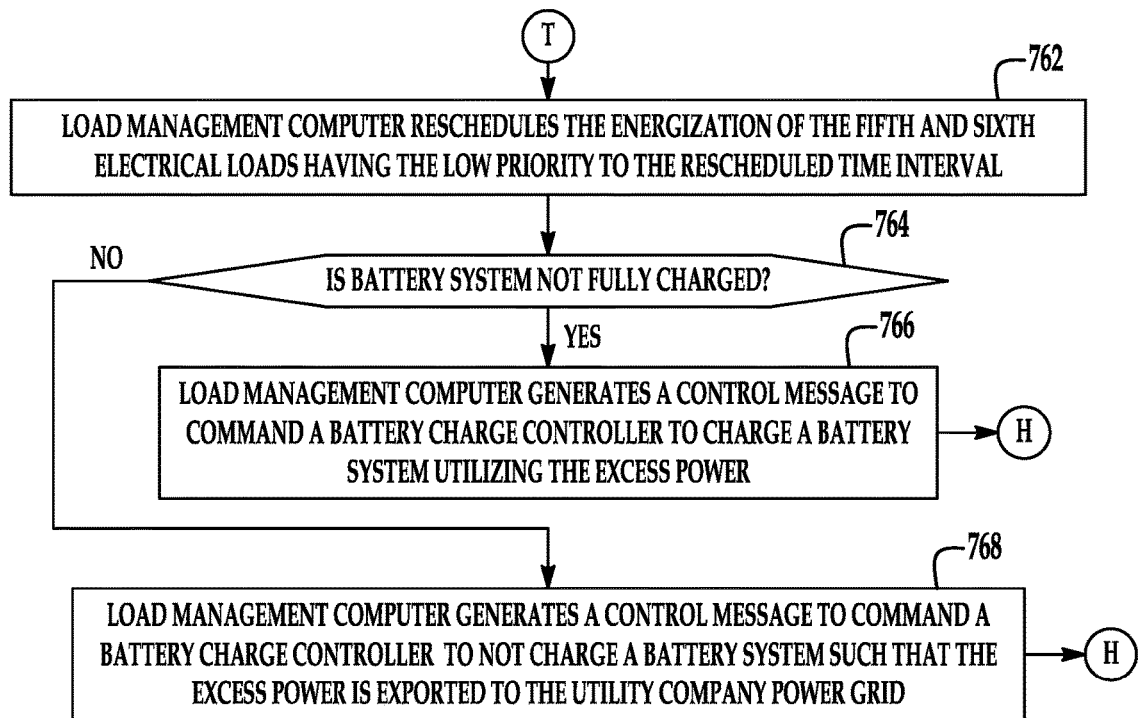

Referring again to step 740, if the value of step 740 equals "no", the method advances to step 760 (shown in FIG. 20). At step 760, the load management computer 112 generates a control message to command a battery charge controller 140 to not charge the battery system 145 such that the excess power is exported to the utility company power grid 40. After step 760, the method returns to step 500 (shown in FIG. 3).

Referring again to step 734 (shown in FIG. 19), if the value of step 734 equals "no", the method advances to step 762. At step 762, the load management computer 112 reschedules the energization of the electrical loads 55, 56 having the low load priority to the rescheduled time interval. After step 762, the method advances to step 764.

At step 764, the load management computer 112 makes a determination as to whether the battery system 145 is not fully charged. If the value of step 764 equals "yes", the method advances to step 766. Otherwise, the method advances to step 768.

At step 766, the load management computer 112 generates a control message to command a battery charge controller 140 to charge a battery system 145 utilizing the excess power. After step 766, the method returns to step 500 (shown in FIG. 3).

Referring again to step 764, if the value of step 764 equals "no", the method advances to step 768. At step 768, the load management computer 112 generates a control signal to command a battery charge controller 140 to not charge the battery system 145 such that the excess power is exported to the utility company power grid 40. After step 768, the method returns to step 500 (shown in FIG. 3).

Figure 22:
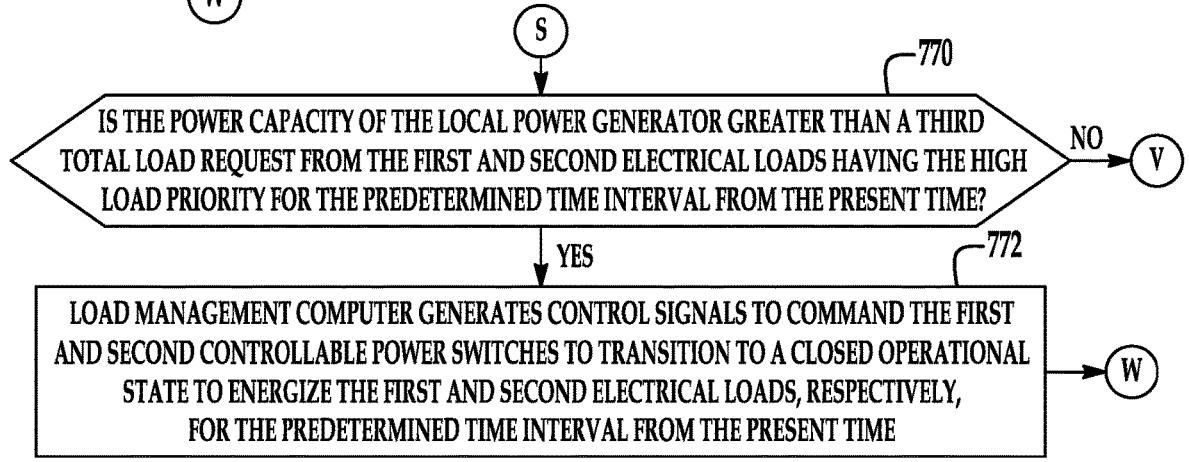
Figure 23:
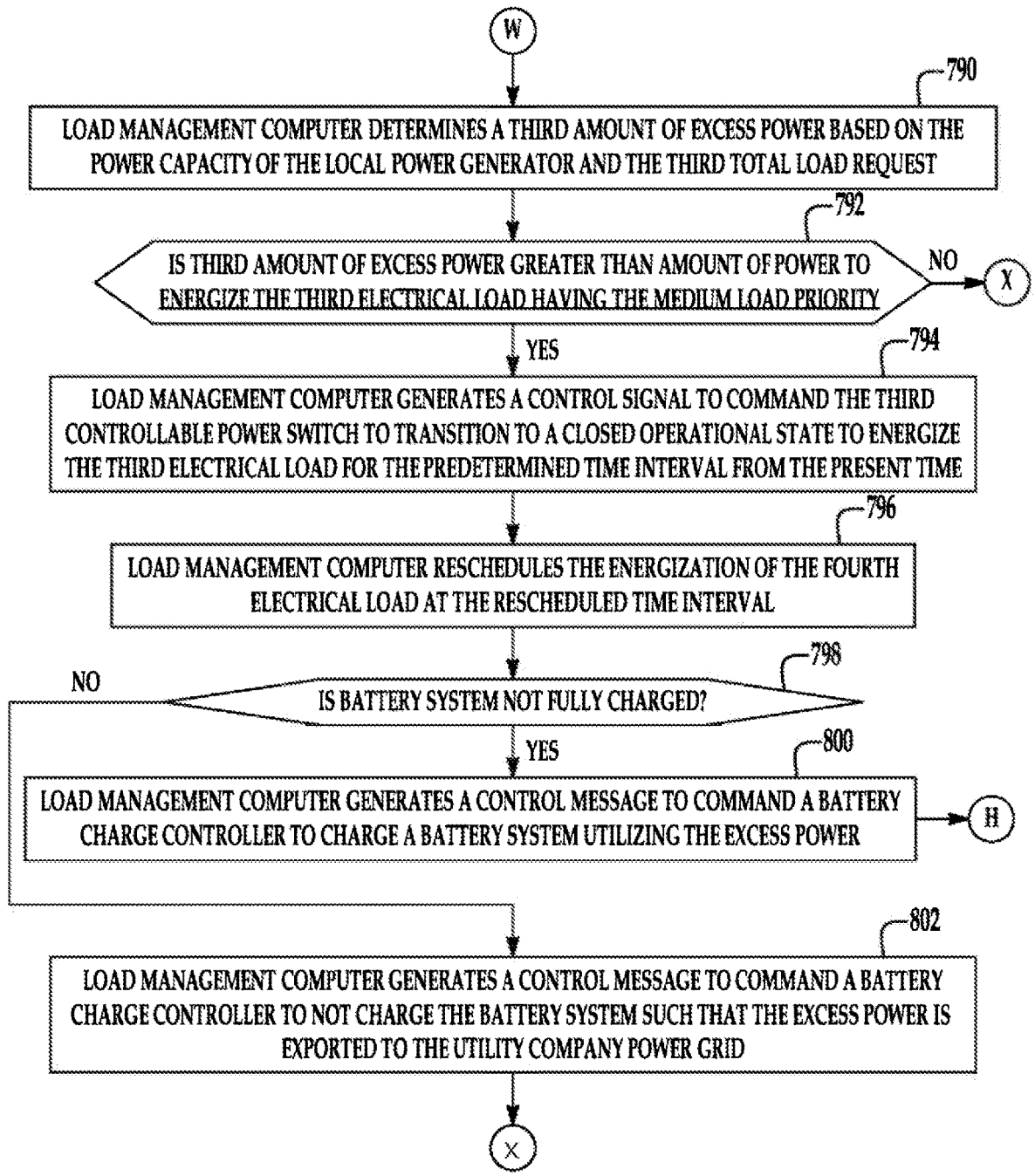
Figure 24:
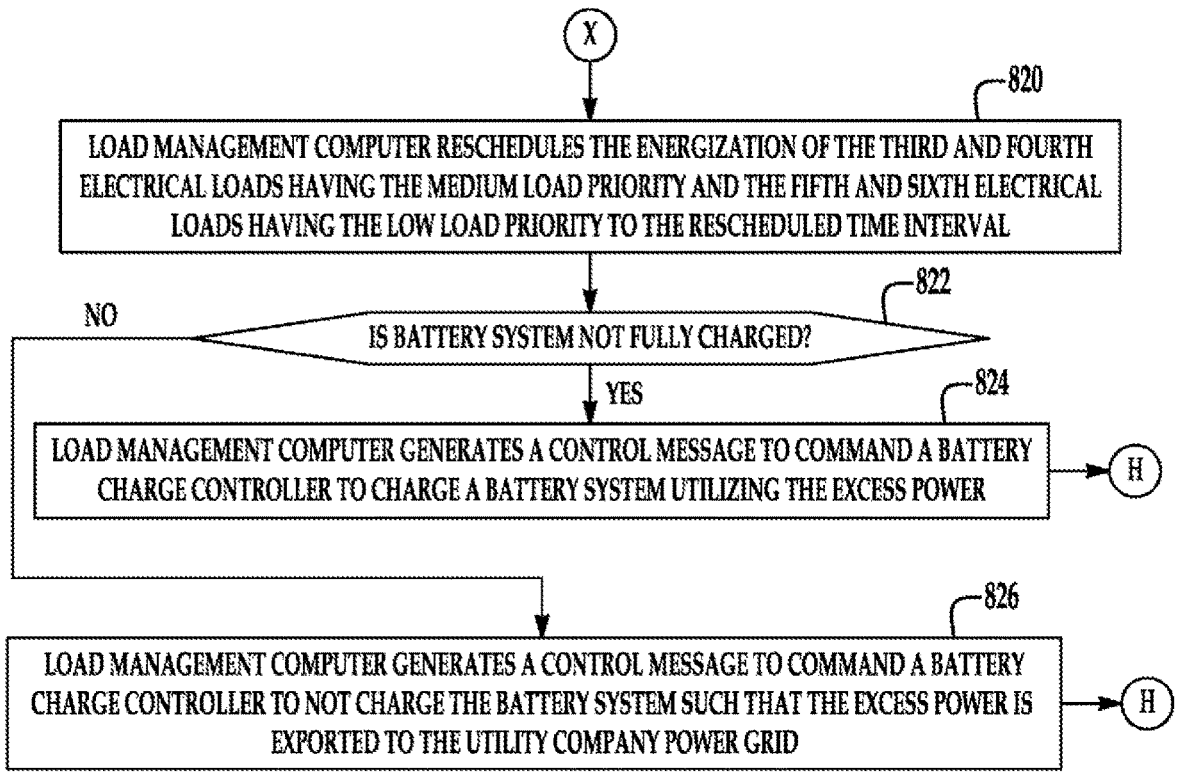
Figure 25:
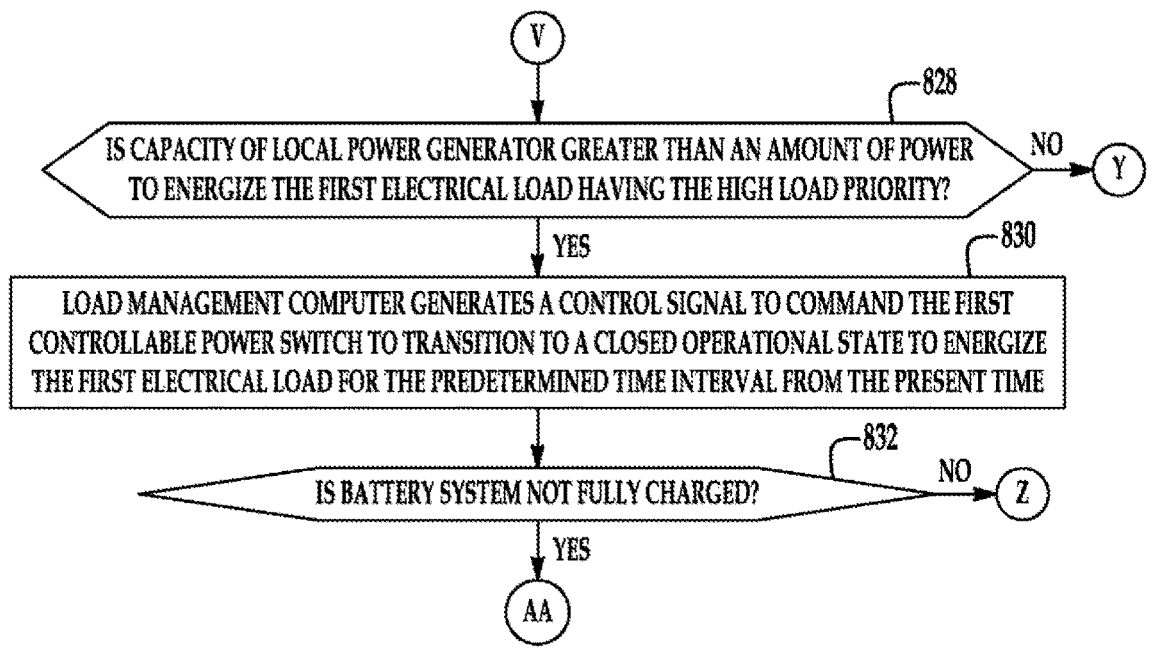
Figure 26:
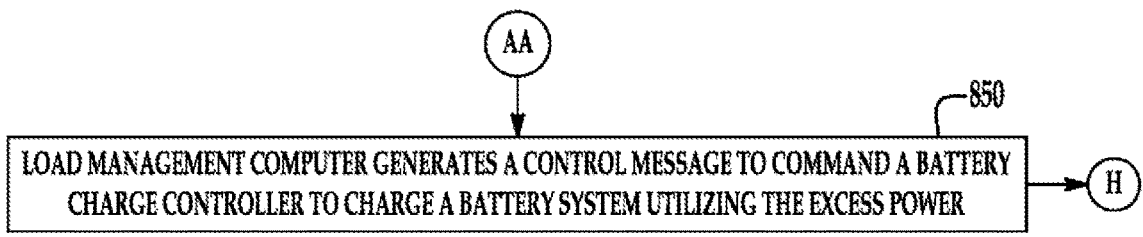
Figure 27:
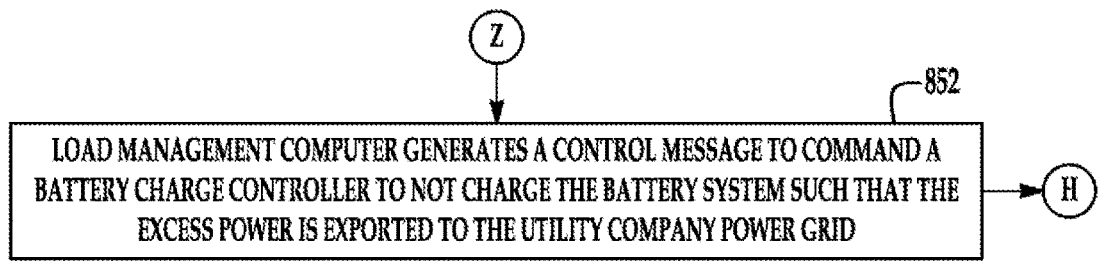
Figure 28:
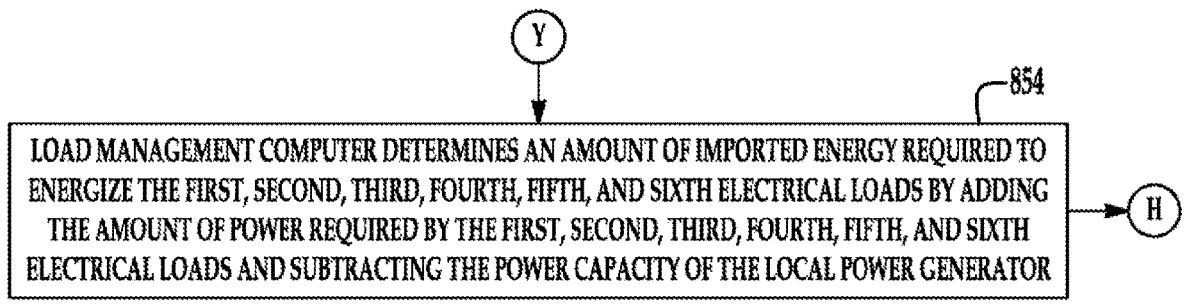

Referring again to step 710 (shown in FIG. 18), if the value of step 710 equals "no the method advances to step 770 (shown in FIG. 22). At step 770, the load management computer 112 makes a determination as to whether the power capacity of the local power generator 100 is greater than a than a third total load request from the electrical loads 51, 52 having the high load priority for the predetermined time interval from a present time. If the value of step 770 equals "yes", the method advances to step 772. Otherwise, the method advances to step 828 (shown in FIG. 25).

At step 772, the load management computer 112 generates control signals to command the controllable power switches 151, 152 to transition to a closed operational state to energize the electrical loads 51, 52, respectively, for the predetermined time interval from the present time. After step 772, the method advances to step 790.

At step 790, the load management computer 112 determines a third amount of excess power based on the power capacity of the local power generator 100 and the third total load request. After step 790, the method advances to step 792.

At step 792, the load management computer 112 makes a determination as to whether a third amount of excess power is greater than and amount of power to energize the electrical load 53 having the medium load priority. If the value of step 792 equals "yes", the method advances to step 794. Otherwise, the method advances to step 820 (shown in FIG. 24).

At step 794, the load management computer 112 generates a control signal to command the controllable power switch 153 to transition to a closed operational state to energize the electrical load 53 for the predetermined time interval from the present time. After step 794, the method advances to step 796.

At step 796, the load management computer 112 reschedules the energization of the electrical load 54 at the rescheduled time interval. After step 796, the method advances to step 798.

At step 798, the load management computer 112 makes a determination as to whether the battery system 145 is not fully charged. If the value of step 798 equals "yes", the method advances to step 800. Otherwise, the method advances to step 802.

At step 800, the load management computer 112 generates a control message to command a battery charge controller 140 to charge a battery system 145 utilizing the excess power. After step 800, the method returns to step 500 (shown in FIG. 3).

Referring again to step 798, if the value of step 790 equals "no", the method advances to step 802. At step 802, the load management computer 112 generates a control message to command a battery charge controller 140 to not charge the battery system 145 such that the excess power is exported to the utility company power grid 40. After step 802, the method advances to step 820.

At step 820, the load management computer 112 reschedules the energization of the electrical loads 53, 54 having the medium load priority and the electrical loads 55, 56 having the low load priority to the rescheduled time interval. After step 820, the method advances to step 822.

At step 822, the load management computer 112 makes a determination as to whether the battery system 145 is not fully charged. If the value of step 822 equals "yes", the method advances to step 824. Otherwise, the method advances to step 826.

At step 824, the load management computer 112 generates a control message to command a battery charge controller 140 to charge a battery system 145 utilizing the excess power. After step 824, the method returns to step 500 (shown in FIG. 3).

Referring again to step 822, if the value of step 822 equals "no", the method advances to step 826. At step 826, the load management computer 112 generates a control message to command a battery charge controller 140 to not charge the battery system 145 such that the excess power is exported to the utility company power grid 40. After step 826, the method returns to step 500 (shown in FIG. 3).

Referring again to step 770, if the value of step 770 equals "no", the method advances to step 828. At step 828, the load management computer 112 makes a determination as to whether a capacity of local power generator 100 is greater than an amount of power to energize the electrical load 51 having the high load priority. If the value of step 828 equals "yes, the method advances to step 830. Otherwise, the method advances to step 854 (shown in FIG. 28).

At step 830, the load management computer 112 generates a control signal to command the controllable power switch 151 to transition to a closed operational state to energize the electrical load 51 for the predetermined time interval from the present time. After step 830, the method advances to step 832.

At step 832, the load management computer 112 makes a determination as to whether the battery system 145 is not fully charged. If the value of step 832 equals "yes", the method advances to step 850 (shown in FIG. 26). Otherwise, the method advances to step 852 (shown in FIG. 27).

At step 850, the load management computer 112 generates a control message to command a battery charge controller 140 to charge a battery system 145 utilizing the excess power. After step 850, the method returns to step 500 (shown in FIG. 3).

Referring again to step 832, if the value of step 832 equals "no", the method advances to step 852. At step 852, the load management computer 112 generates a control message to command a battery charge controller 140 to not charge the battery system 145 such that the excess power is exported to the utility company power grid 40. After step 852, the method returns to step 500 (shown in FIG. 3).

Referring again to step 828 (shown in FIG. 25), if the value of step 828 equals "no", the method advances to step 854. At step 854, the load management computer 112 determines an amount of imported energy required to energize the electrical loads 51, 52, 54, 55, 56 by adding the amount of power required by the electrical loads 51, 52, 53, 55, 56 and subtracting the power capacity of the local power generator 110. After step 854, the method returns to step 500 (shown in FIG. 3).

The electrical load management system described herein provides a substantial advantage over other systems. In particular, the electrical load management system selects specific electrical loads to be energized from a plurality of electrical loads to ensure that a total load request associated with the energized electrical loads is below a demand threshold, utilizing a load priority of each of the plurality of electrical loads.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. An electrical load management system for controlling a plurality of electrical loads, comprising:
   a local energy generator;
   a main electrical energy service panel being electrically coupled to the local energy generator, a battery, and a utility company power grid;
   a first power meter for outputting an energy signal indicating an energy capacity corresponding to an amount of electrical energy being output by the local energy generator to the main electrical service panel;
   a load management computer being operably coupled to said first energy meter and to each electrical load of said plurality of electrical loads, to a battery charge controller of said battery system and said utility company computer server, said load management computer determining electrical load priority of each of said plurality of electrical loads relying on electrical load records of said plurality of electrical loads;
   said load management computer correlating the electrical load requirements determined from said electrical load records with electrical energy generated by said local energy generator identified by said first energy meter thereby determining if generation of power electrical energy from said local energy generator is sufficient to meet electrical requirements of said plurality of electrical loads or exceeds the electrical requirements of said plurality of electrical loads;
   said load management computer directing electrical energy from at least one of said local energy generator, said utility company energy grid and said battery system through said electrical energy service panel to meet electrical requirement of each of said plurality of electrical loads;
   said load management computer optimizing allocation of electrical energy to each of the electrical loads by allocating one of less than sufficient electrical energy, sufficient electrical energy or more than sufficient electrical energy to meet electrical load requirements of the electrical load priorities as determined from the electrical load records; and said load management computer identifying a maximum demand of electrical energy from said electrical load records of at least one of said electrical loads and increasing the maximum demand of energy of at least one of said electrical loads based upon a hierarchy of electric load priorities stored in said load management computer for transferring excess electrical energy to at least one of said electrical loads in excess of said maximum demand of electrical energy identified in said electrical load records.

2. The system set forth in claim 1, wherein said load management computer is electronically connected to a controllable power switch of each of said electrical loads via said main electrical service panel for selectively allocating electrical energy.

3. The system set forth in claim 1, wherein said load management computer signals said main electrical service panel to selectively allocate electrical energy generated by said local power generator to at least one of said plurality of electrical loads, a battery system and a utility company power grid.

4. The system set forth in claim 1, wherein said load management computer adjusts at least some of said electrical loads in response to an amount of electrical energy generated by said local power generator.

5. The system set forth in claim 1, wherein said load management computer includes a memory device for storying a load priority table and said electrical load records thereby enabling said load management computer to optimize allocation of electrical energy based upon load priorities and electrical load records.

6. The system set forth in claim 1, further including a battery charge controller being electronically connected to said load management computer thereby enabling said battery charge controller to at least one of direct charge of said battery system and allocated electrical energy from said battery system to said main electrical service panel for providing electrical energy to said plurality of electrical loads from said battery system.

7. The system set forth in claim 1, wherein said load management computer via said electrical service panel simultaneously allocates energy directed from said local power source to the utility company power grid and to said plurality of electrical power loads.

8. The system set forth in claim 1, wherein said load management computer via said main electrical service panel simultaneously allocated electrical energy to said plurality of electrical loads from said local power generator and said battery system.

9. The system set forth in claim 1, wherein said load management computer via said main electrical service panel increases and decreases electrical load of any of said responsive to said electrical load records stored in said memory device and to an amount of electrical energy generated by said local power generator.

* * * * *